Figure 1:
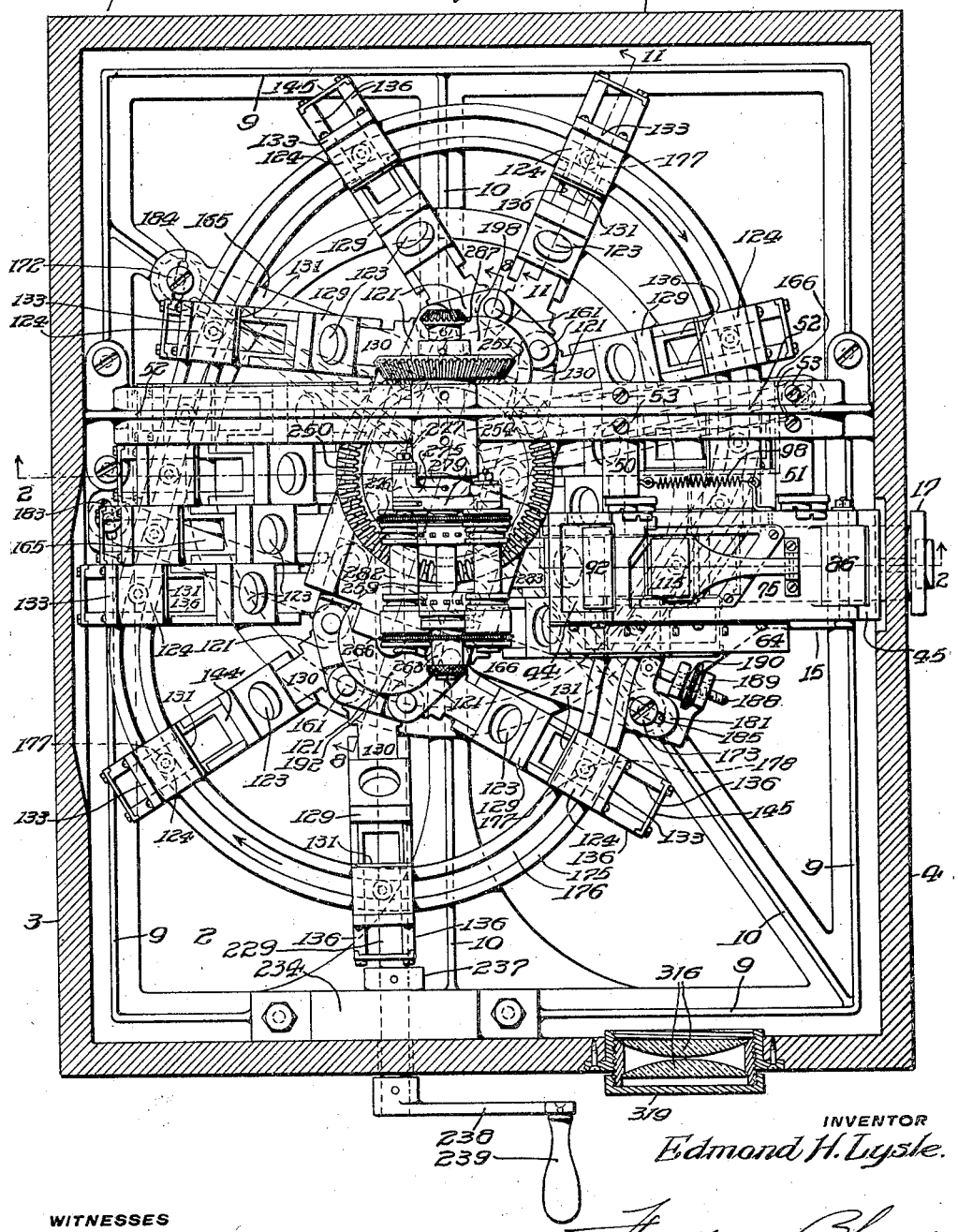

E. H. LYSLE.
OPTICAL DEVICE.
APPLICATION FILED JAN. 22, 1916.

1,375,923.

Patented Apr. 26, 1921.
16 SHEETS—SHEET 1.

INVENTOR
Edmond H. Lysle.

WITNESSES

BY

ATTORNEYS

E. H. LYSLE.
OPTICAL DEVICE.
APPLICATION FILED JAN. 22, 1916.

1,375,923.

Patented Apr. 26, 1921.
16 SHEETS—SHEET 4.

INVENTOR
Edmond H. Lysle.

WITNESSES

BY

ATTORNEYS

E. H. LYSLE.
OPTICAL DEVICE.
APPLICATION FILED JAN. 22, 1916.

1,375,923.

Patented Apr. 26, 1921.
16 SHEETS—SHEET 5.

INVENTOR
Edmond H. Lysle.

WITNESSES
F. J. Hartman.

BY

ATTORNEYS

E. H. LYSLE.
OPTICAL DEVICE.
APPLICATION FILED JAN. 22, 1916.
1,375,923.
Patented Apr. 26, 1921.
16 SHEETS—SHEET 6.
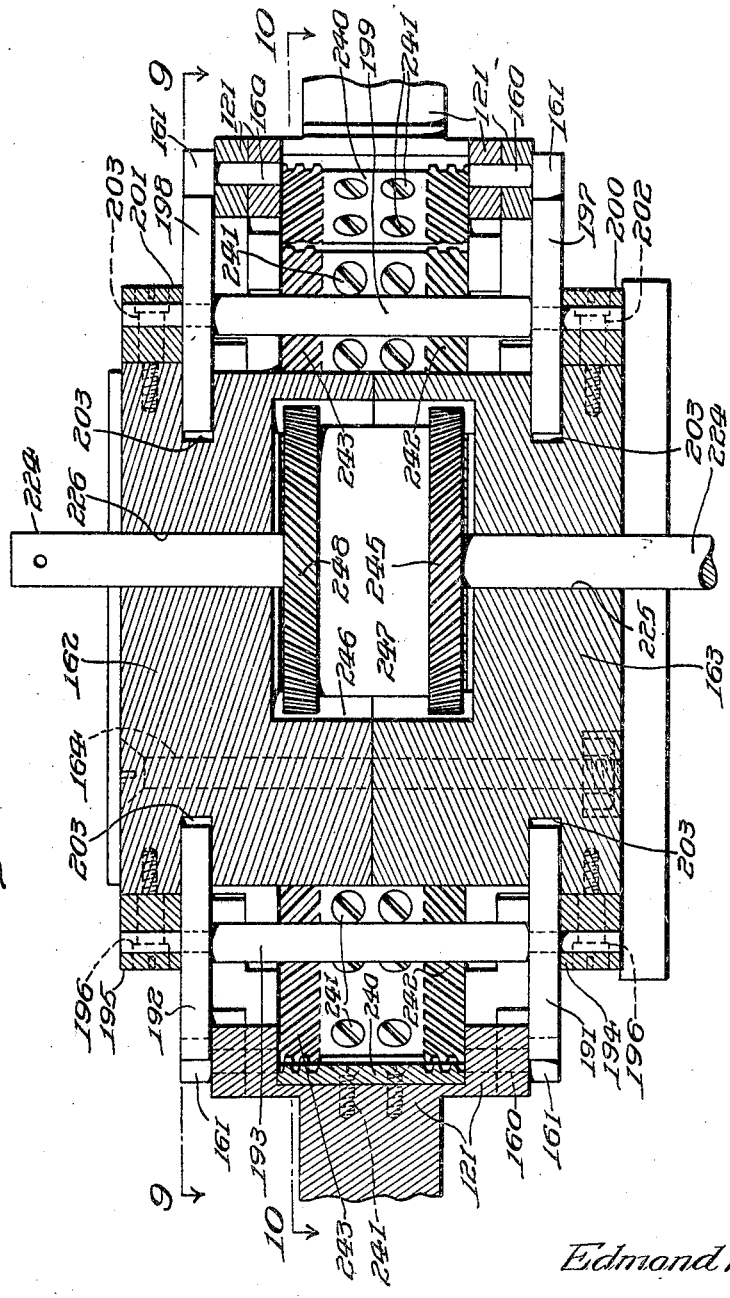
INVENTOR
Edmond H. Lysle.
WITNESSES
BY
ATTORNEYS

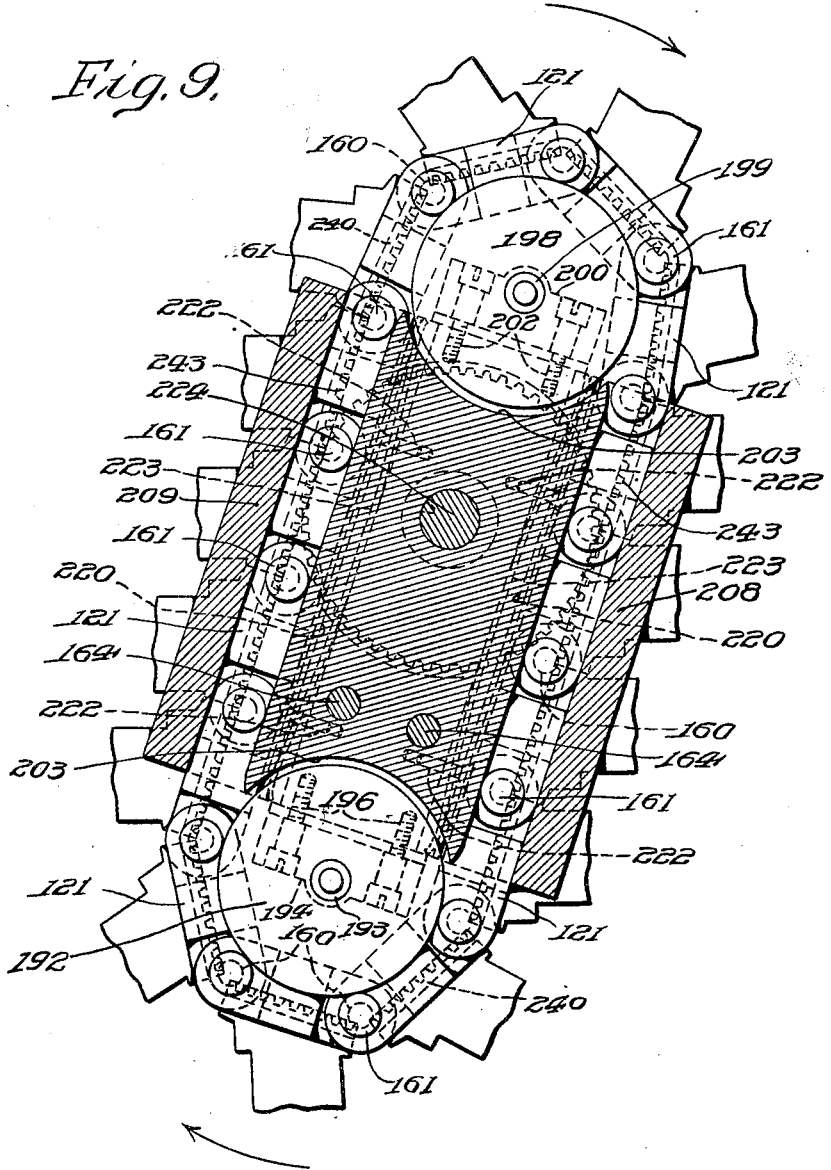

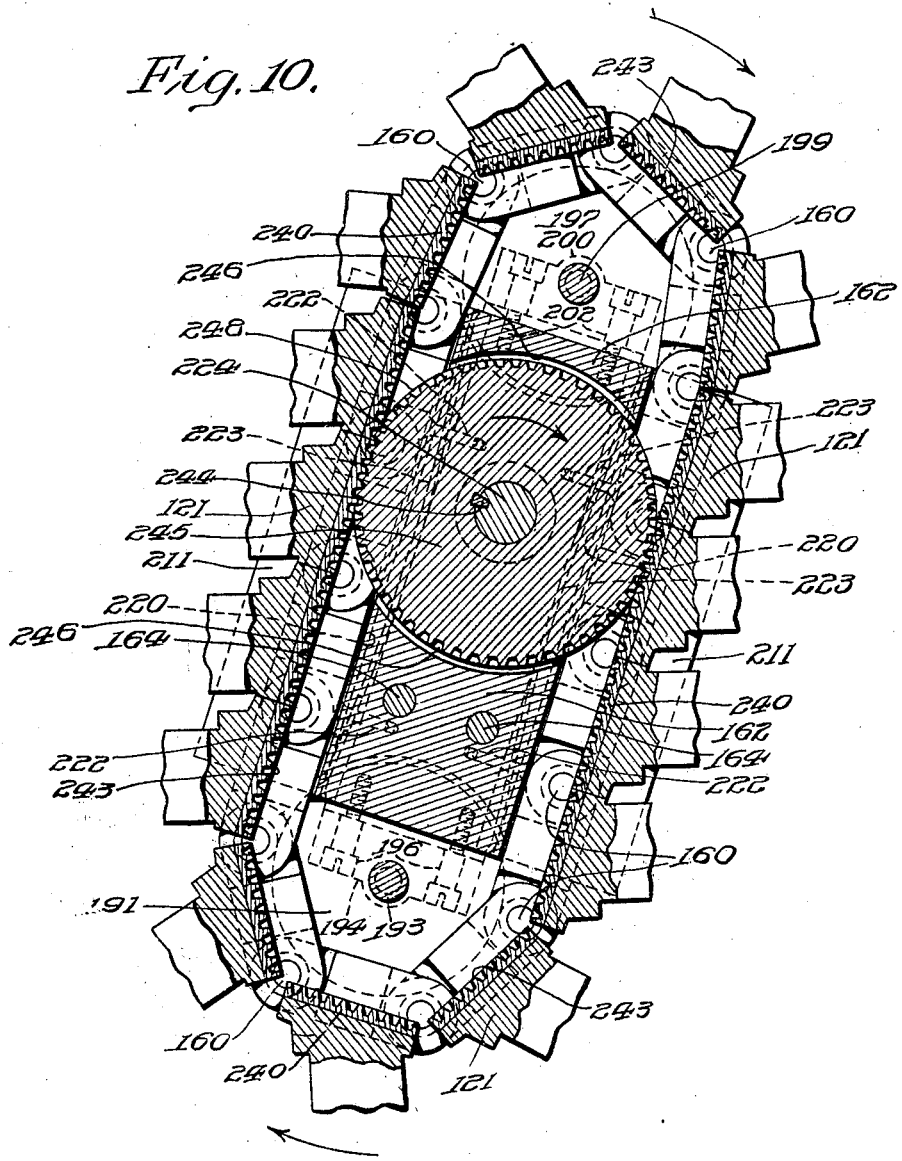

E. H. LYSLE.
OPTICAL DEVICE.
APPLICATION FILED JAN. 22, 1916.
1,375,923.
Patented Apr. 26, 1921.
16 SHEETS—SHEET 9.
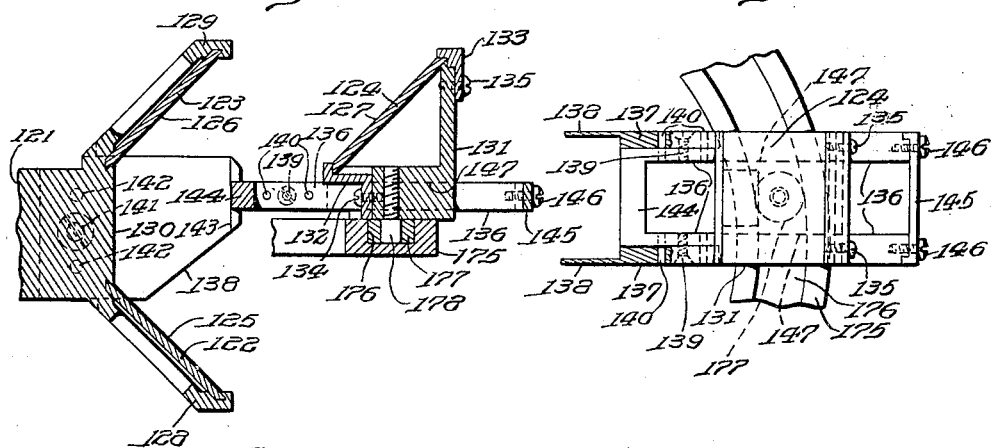
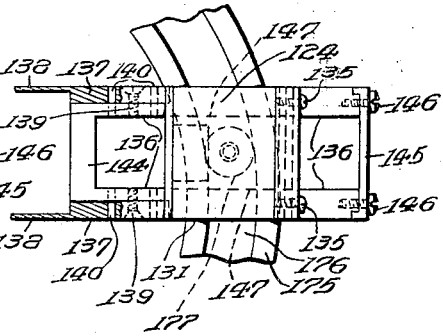
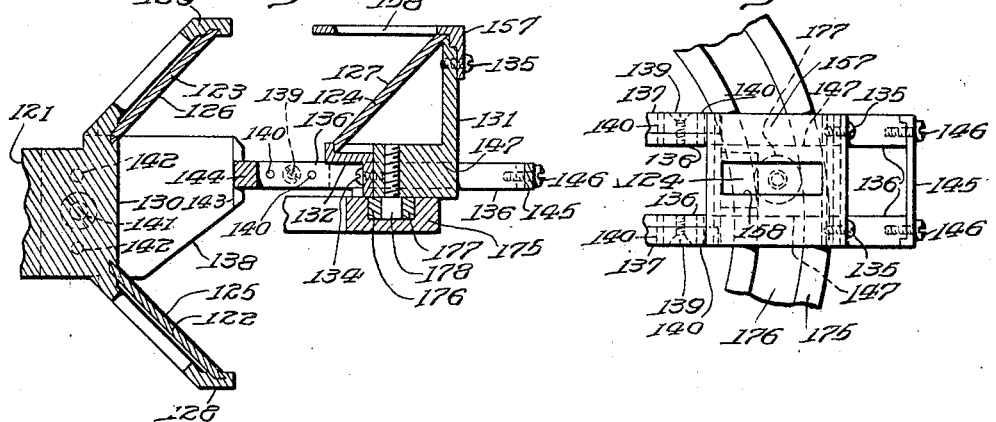
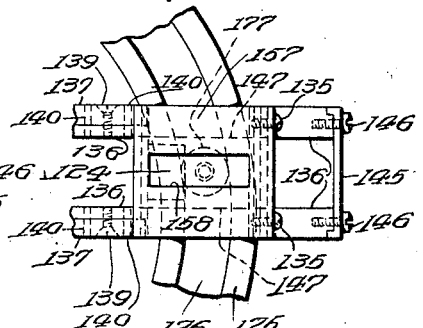
INVENTOR
Edmond H. Lysle.
WITNESSES
BY
ATTORNEYS

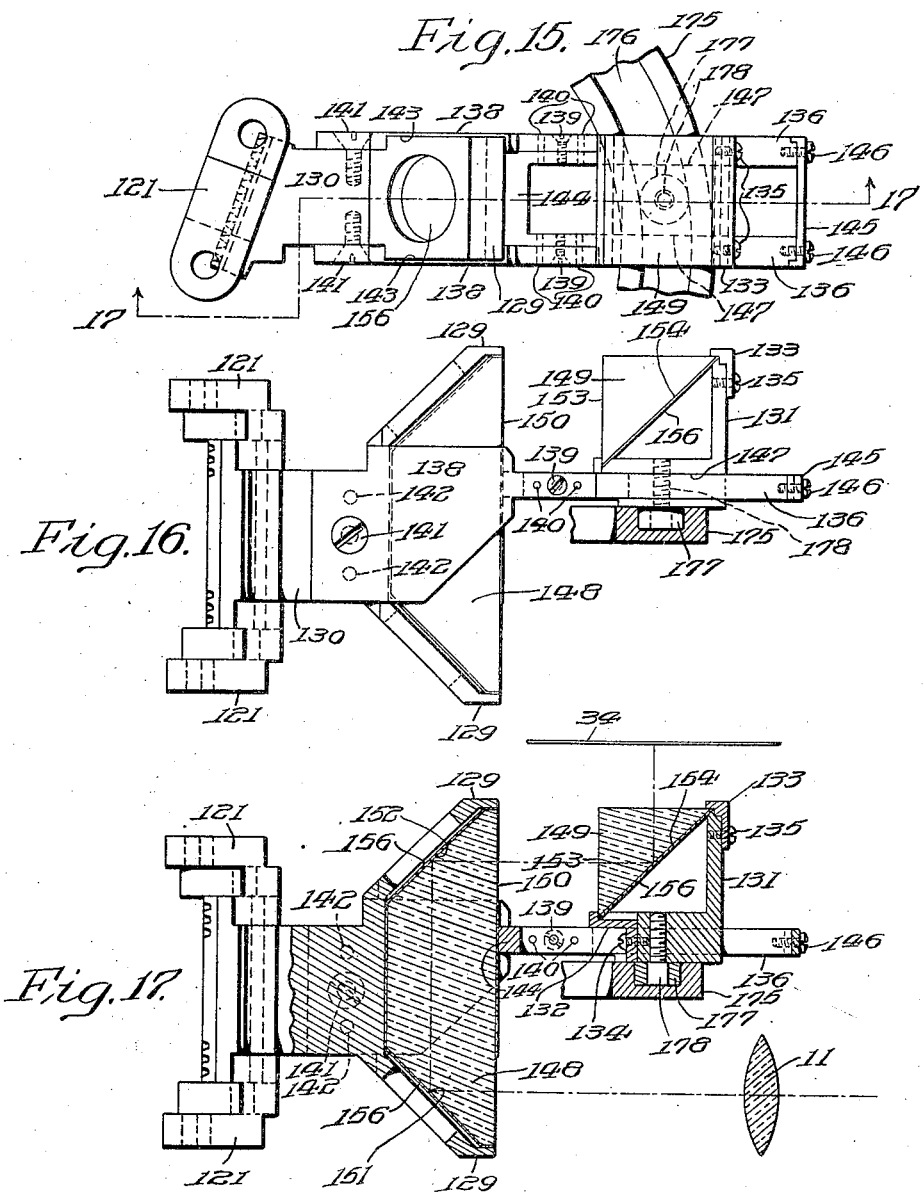

E. H. LYSLE.
OPTICAL DEVICE.
APPLICATION FILED JAN. 22, 1916.
1,375,923.
Patented Apr. 26, 1921.
16 SHEETS—SHEET 11.
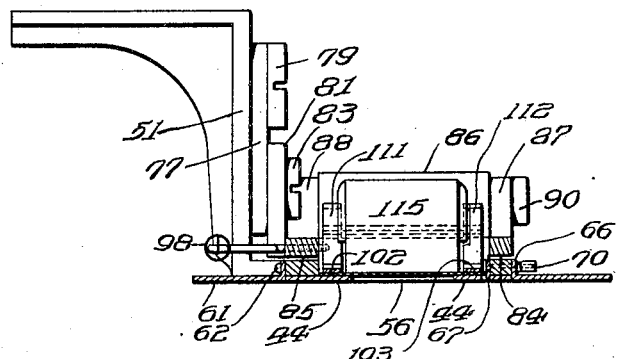
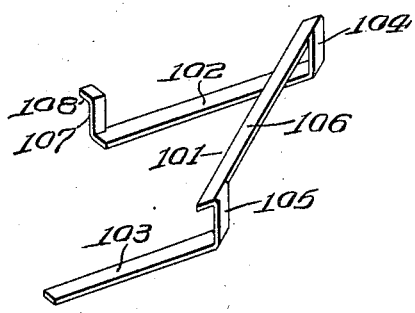
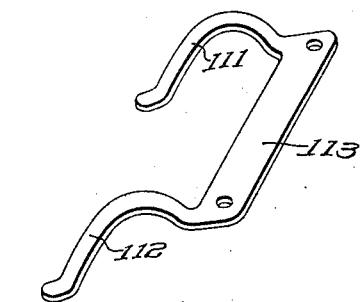
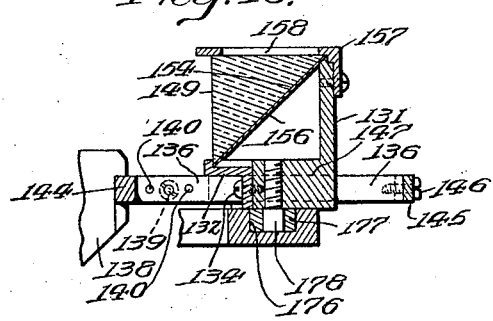
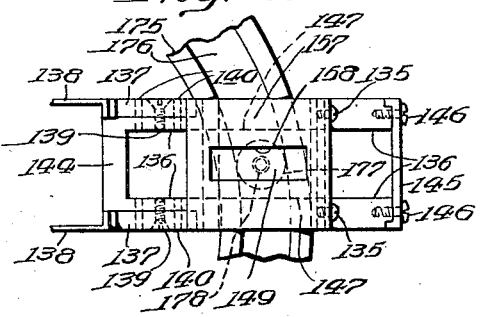
INVENTOR
Edmond H. Lysle.
WITNESSES
F. J. Hartman.
BY
ATTORNEYS

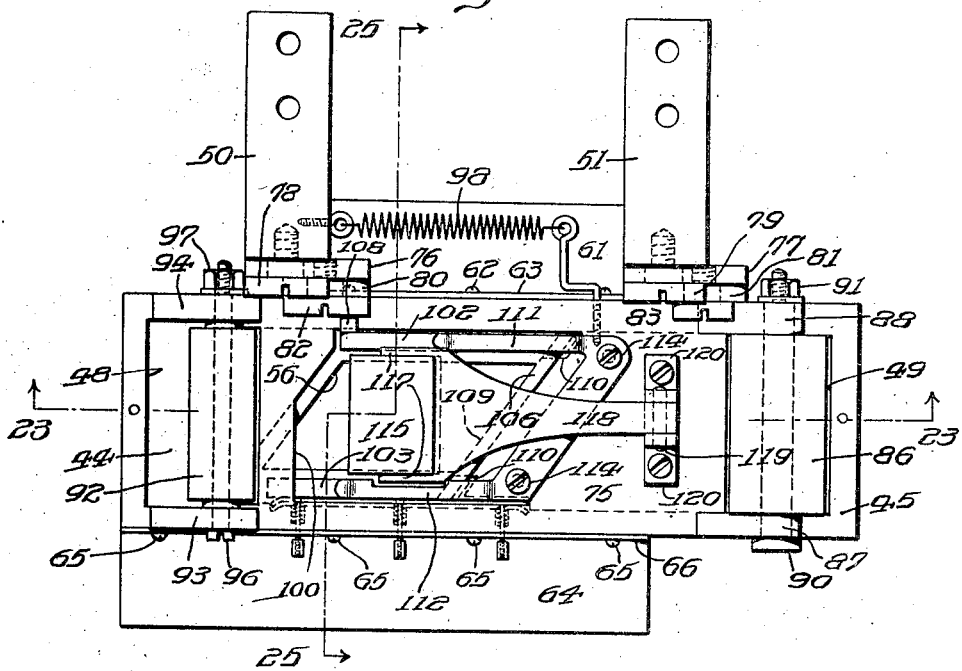

E. H. LYSLE.
OPTICAL DEVICE.
APPLICATION FILED JAN. 22, 1916.
1,375,923.
Patented Apr. 26, 1921.
16 SHEETS—SHEET 13.
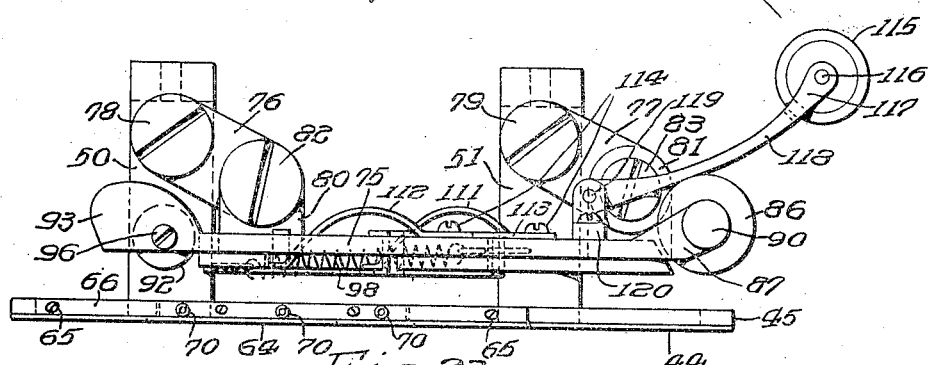
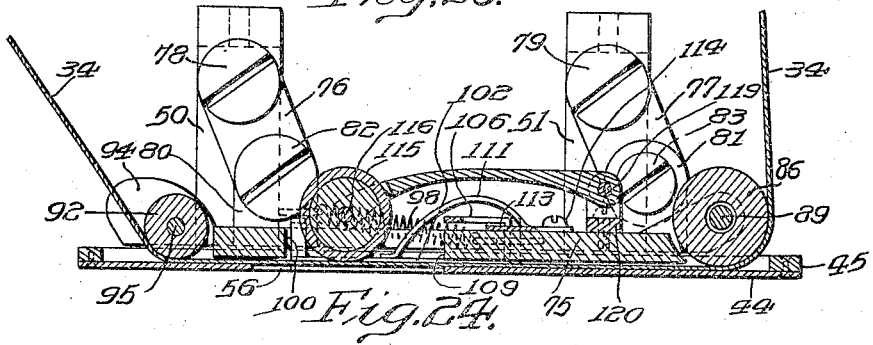
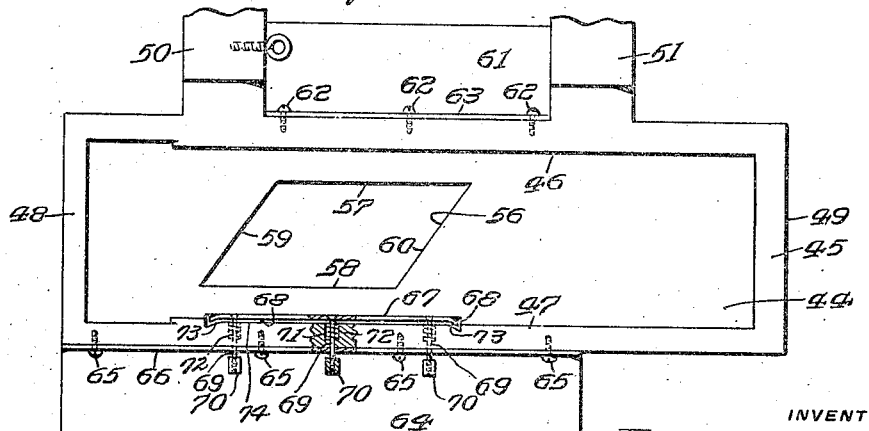
INVENTOR
Edmond H. Lysle.
WITNESSES
BY
ATTORNEYS

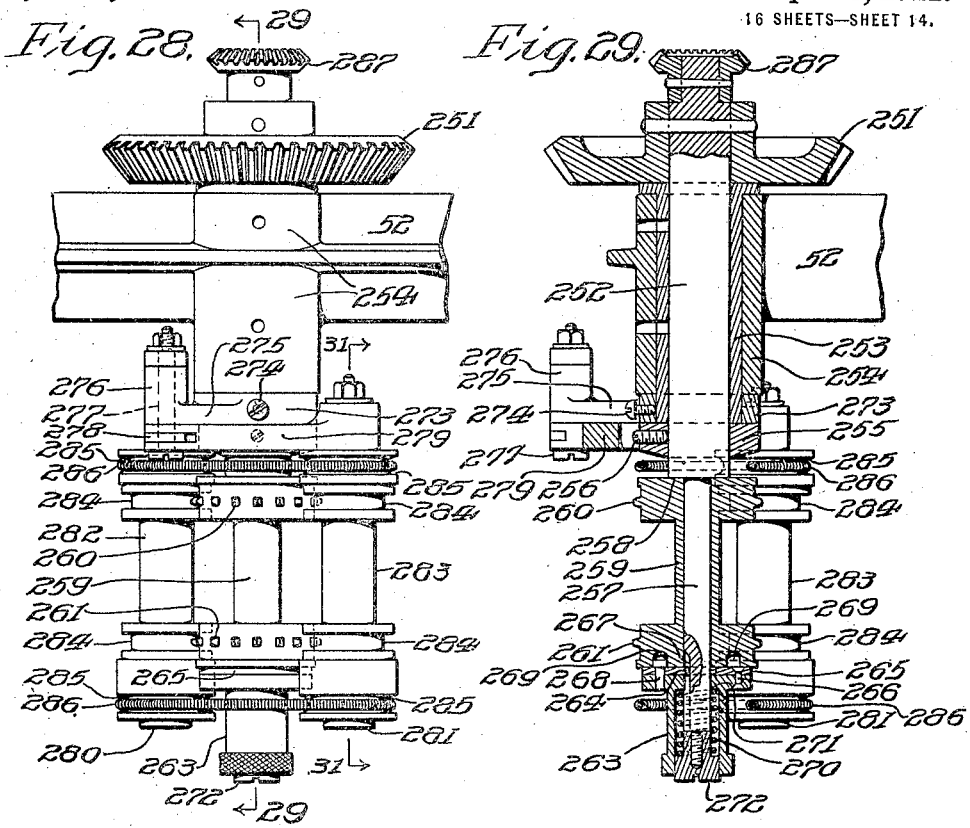
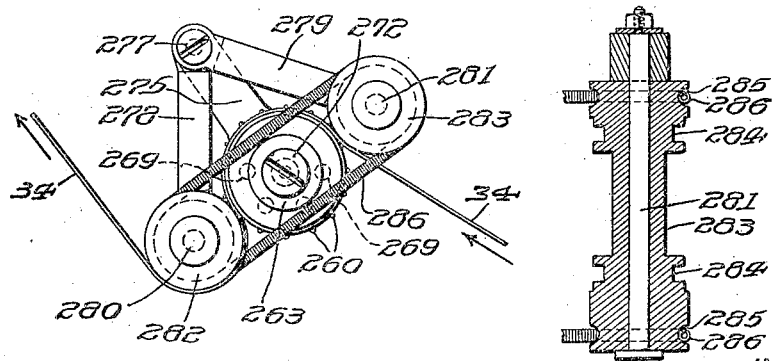

E. H. LYSLE.
OPTICAL DEVICE.
APPLICATION FILED JAN. 22, 1916.
1,375,923.
Patented Apr. 26, 1921.
16 SHEETS—SHEET 15.
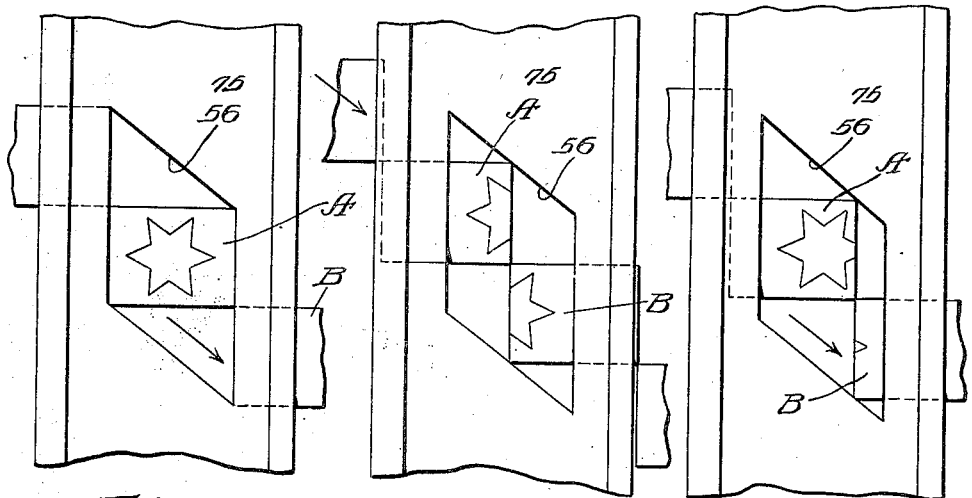
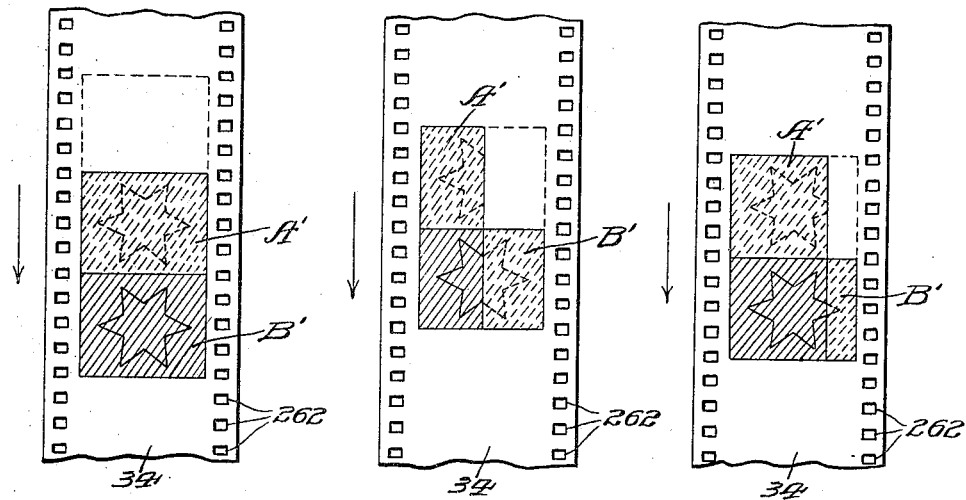
WITNESSES
INVENTOR
Edmond H. Lysle
BY
ATTORNEYS

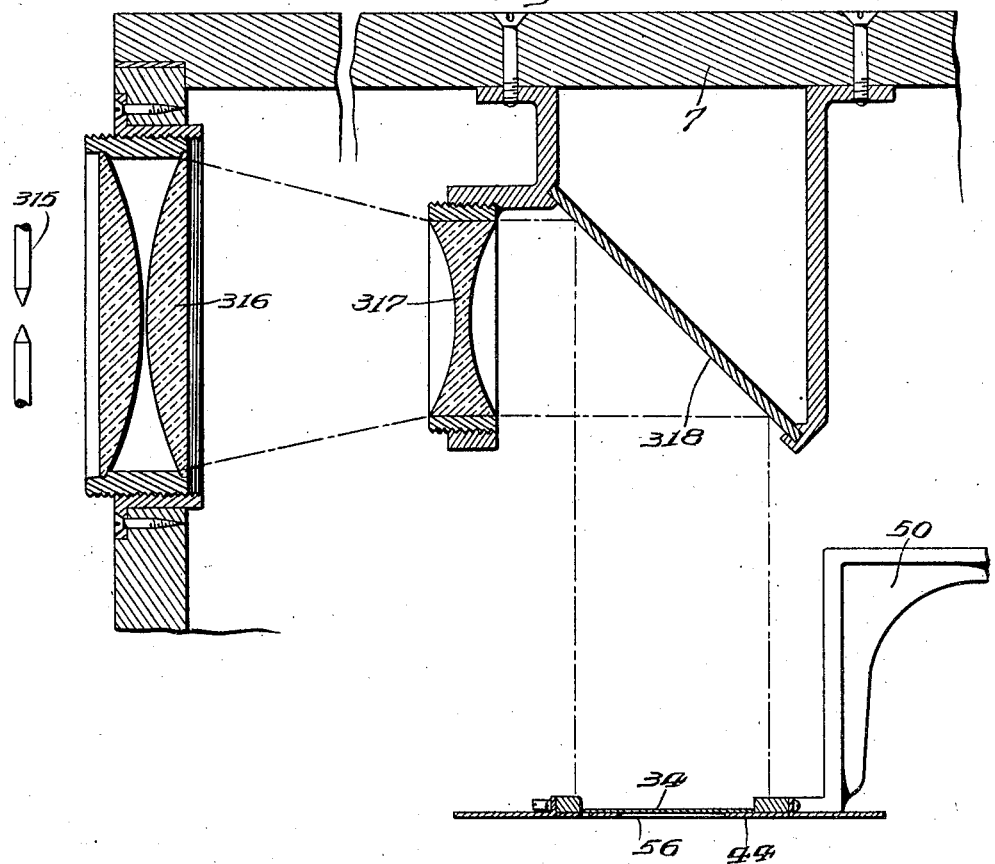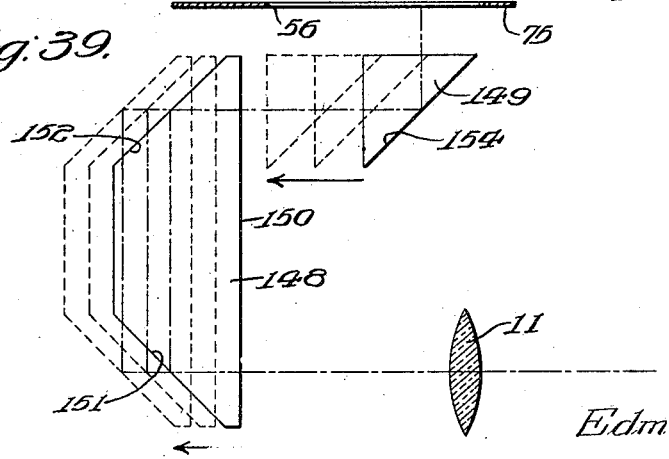

UNITED STATES PATENT OFFICE.

EDMOND H. LYSLE, OF NEW YORK, N. Y.

OPTICAL DEVICE.

1,375,923.     Specification of Letters Patent.     Patented Apr. 26, 1921.

Application filed January 22, 1916. Serial No. 73,642.

*To all whom it may concern:*

Be it known that I, EDMOND H. LYSLE, a citizen of the United States, and a resident of the city of New York, State of New York, have invented certain new and useful Improvements in Optical Devices, of which the following is a specification.

It is well-known that in the moving picture machines now in general use, a series of negative pictures are formed on a moving picture film by a series of exposures on an intermittently moving film, the film being exposed only while at rest, and in projecting moving pictures upon a screen, a positive made from this negative is given a corresponding intermittent movement in coöperation with a correspondingly synchronized shutter between the shutter and a source of light, whereby pictures are thrown intermittently upon the screen, the shutter being kept open only while the film is stationary. It is, therefore, evident that in the ordinary form of moving picture machine, only a partial pictorial record is made either on the moving picture film or upon the screen.

The present invention provides means for producing a complete or continuous pictorial record of any moving subject-matter, and provides means for projecting on a screen this complete and continuous pictorial record. This invention, therefore, not only provides means for producing a smooth continuous complete pictorial record either permanently upon a moving picture film or temporarily upon an illuminated screen, but also incidentally eliminates the intermittent action or sudden reversals from light to dark, or to a comparative absence of light, incident to the use of ordinary machines, and which is known as "flicker". This invention also incidentally greatly reduces the wear upon the film which is necessarily excessive in the moving picture machines in which intermittent movement of the film is necessitated.

One object of this invention, briefly stated, is to provide an improved machine or an apparatus adapted to be utilized either as a camera for producing, upon a continuously moving sensitized picture film or other sensitized image surface, a series of consecutively arranged pictures forming a permanent and continuous record of successive phases of motion, or as a projector for exhibiting upon a suitable screen a continuous image, thus forming a continuous pictorial reproduction of an object in motion.

Further objects of this invention are to provide an improved camera; to provide an improved projector; and to provide other improvements as will appear hereinafter.

Another object of this invention is to provide an improved optical device which may be used as a projector to project upon a screen an image from a continuously moving projective medium or positive print through a stationary lens system and which may also be used as a camera by means of which a continuously moving properly sensitized photographic medium can be exposed to the action of light entering through a fixed lens system, for a shorter interval than is required to pass the exposed portion of the film through the area of illumination.

A further object of my invention is to provide a device in which every portion of a continuously moving sensitized film or of a positive film, while passing through the area of illumination of a fixed lens system, is at an optically constant distance from the center of said lens system, this result being attained by the use of two or more reflecting media constantly moved with respect to each other and with respect to said film while said film is passing through said field.

Other objects of my invention will appear in the specification and claims below.

Figure 2:
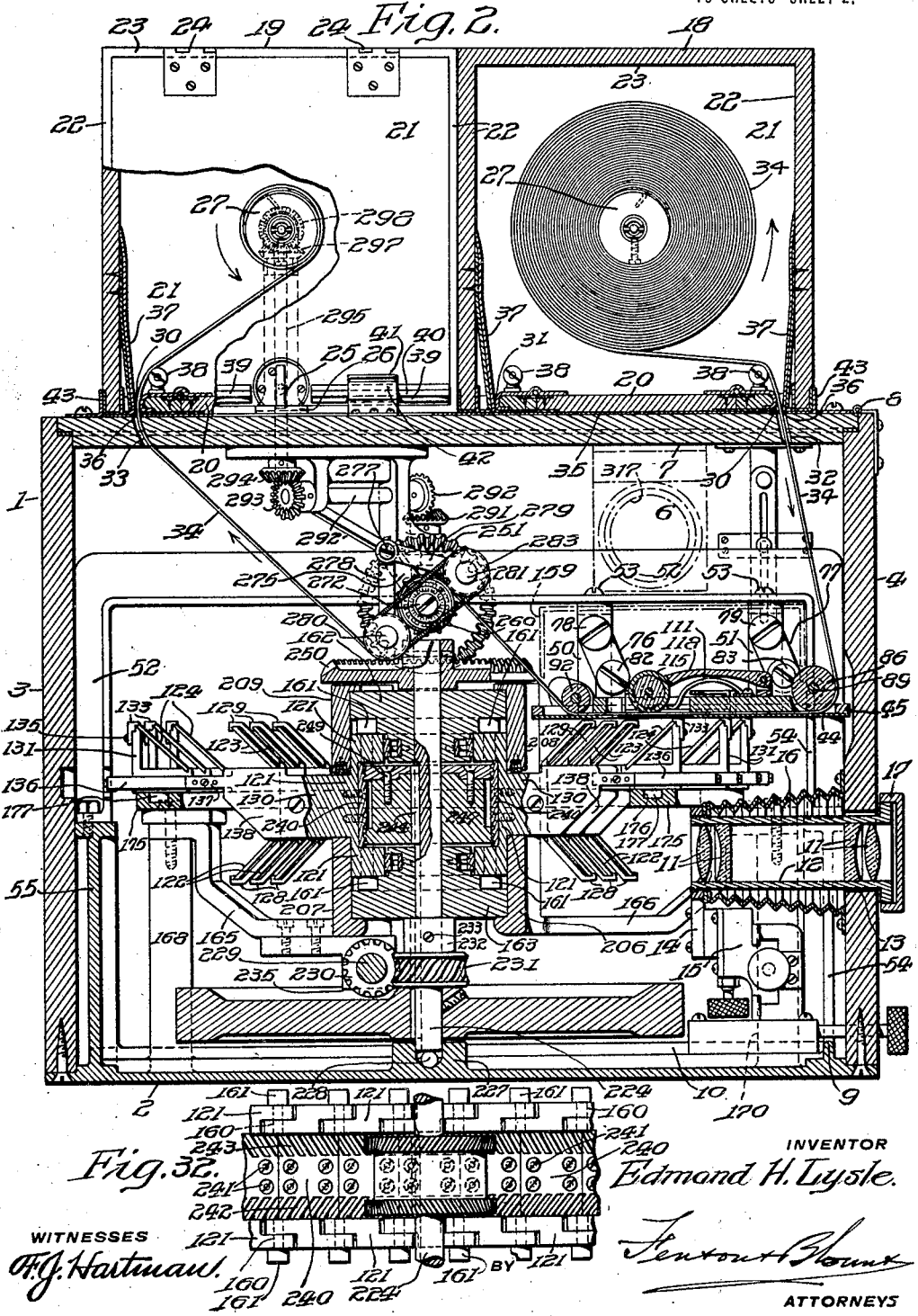
Figure 3:
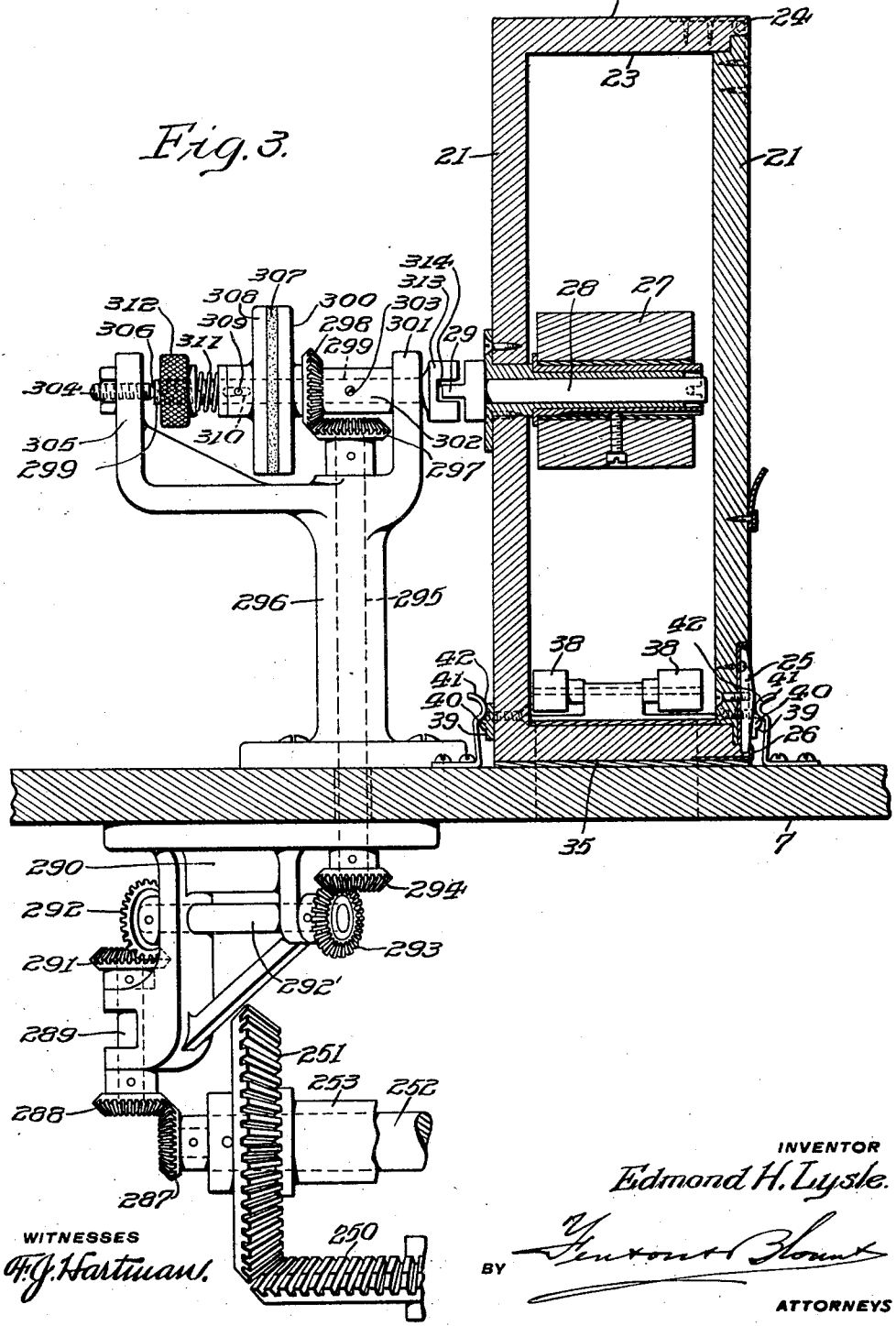
Figure 4:
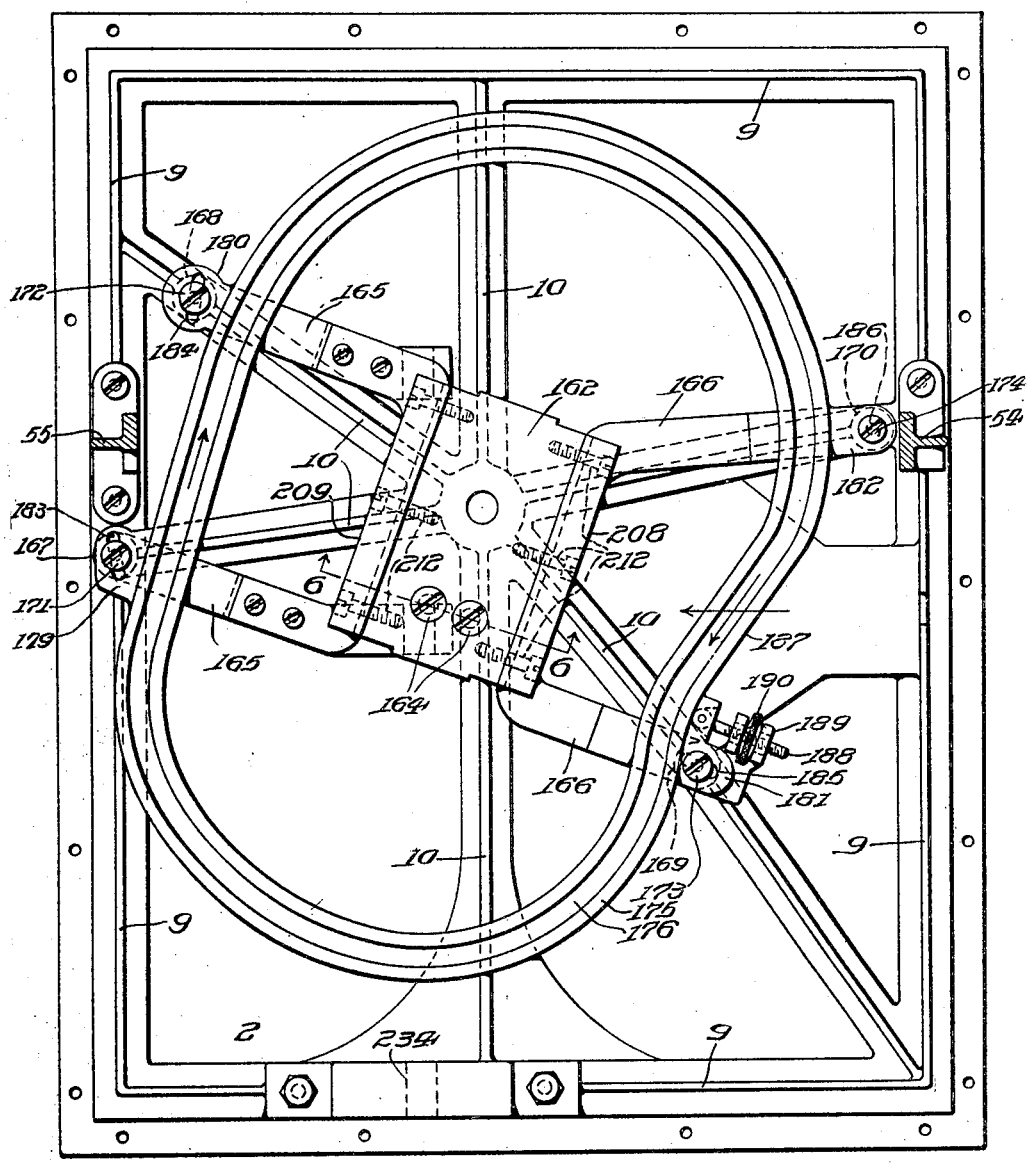
Figure 5:
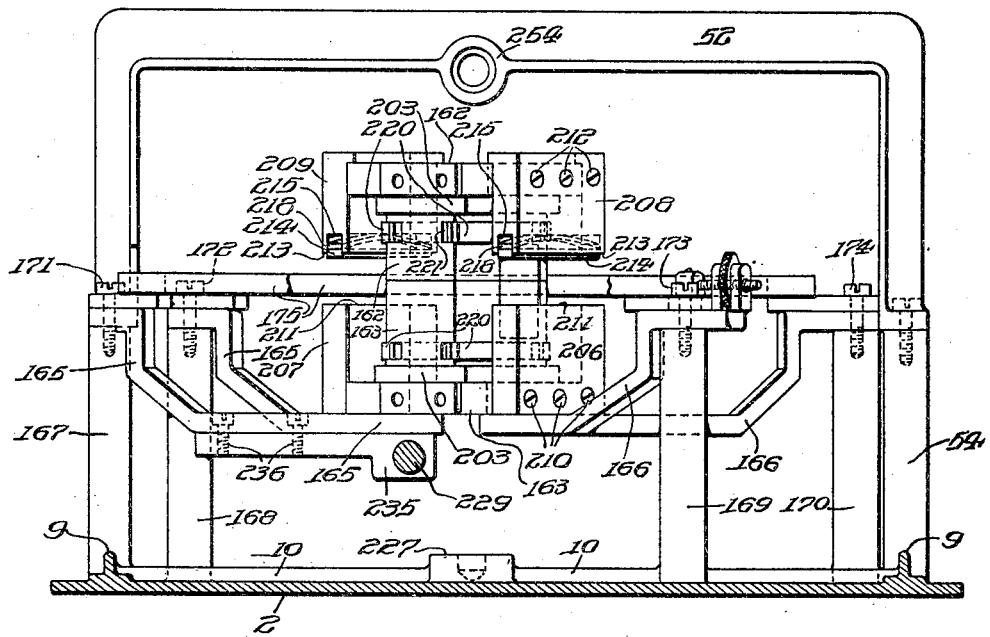
Figures 6, 7:
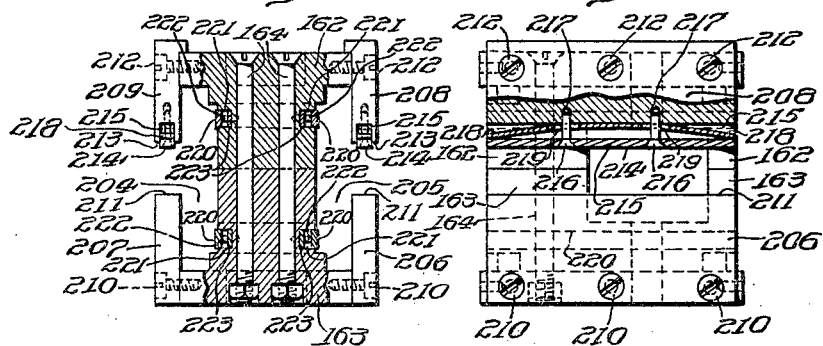

In the accompanying drawings, Figure 1 is a top plan view partially in horizontal section of an optical apparatus or machine constructed in accordance with this invention, the upper portion of the same being removed for clearness of illustration; Fig. 2 is a vertical transverse fragmentary section of the same on line 2—2 of Fig. 1; Fig. 3 is an enlarged fragmentary vertical section of a portion of the same; Fig. 4 is a top plan view of a portion of the same; Fig. 5 is an end elevation partially in vertical section of a portion shown in Fig. 4; Fig. 6 is a fragmentary vertical section on line 6—6 of Fig. 4; Fig. 7 is a fragmentary side elevation partially in vertical longitudinal section of the portion shown in Fig. 6; Fig. 8 is an enlarged fragmentary vertical central section on line 8—8 of Fig. 1; Fig. 9 is a horizotnal section on line 9—9 of Fig. 8; Fig. 10 is a horizontal section on line 10—10 of Fig. 8; Fig. 11 is an enlarged vertical section on line 11—11 of Fig. 1; Fig. 12 is a fragmentary top plan view of a portion shown in Fig. 11; Fig. 13 is a vertical section similar to that shown in Fig. 11 but of a modified form of this invention; Fig. 14 is a fragmentary top plan view of a portion shown in Fig. 13; Fig. 15 is an enlarged fragmentary top plan view of a modified form of a portion of this device; Fig. 16 is a side elevational view of the construction illustrated in Fig. 15; Fig. 17 is a fragmentary section on line 17—17 of Fig. 16; Fig. 18 is a fragmentary vertical section showing a further modification of a portion of this device; Fig. 19 is a fragmentary top plan view of a portion shown in Fig. 18; Fig. 20 is an enlarged top plan view of a portion of the machine shown in Figs. 1 and 2; Fig. 21 is a side elevation of a portion shown in Fig. 20; Fig. 22 is a side elevation corresponding with Fig. 21 but with certain parts elevated; Fig. 23 is a longitudinal central vertical section on line 23 of Fig. 20; Fig. 24 is a top plan view partially in fragmentary horizontal section of some of the elements shown in Fig. 20; Fig. 25 is a transverse vertical section on line 25—25 of Fig. 20; Figs. 26 and 27 are enlarged perspectives of certain elements shown in Fig. 20; Fig. 28 is an enlarged fragmentary top plan view of a portion of the machine shown in Figs. 1 and 2; Fig. 29 is a vertical section on line 29 of Fig. 28; Fig. 30 is an end elevation of parts shown in Fig. 28; Fig. 31 is a vertical section on line 31—31 of Fig. 28; Fig. 32 is a view of the gearing for driving the series of reflectors; Figs. 33, 34 and 35 are diagrammatic views showing the movements of the reflectors immediately beneath the film or photographic medium and the manner in which the image appears on said reflectors in three illustrative positions; Figs. 36, 37 and 38 similarly illustrate the progression of the film or photographic medium through the field of illumination of the lens system and the manner in which the image appears to sweep over to adjacent portions of the said medium simultaneously; Fig. 39 is a diagrammatic side elevational view of the arrangement and travel of the reflectors; and Fig. 40 is a sectional view showing the disposition of the projector parts with respect to the casing and the film platform.

Referring to the drawings (and particularly to Figs. 1 and 2), one embodiment of this invention comprises a main rectangular casing 1 providing a light-tight main compartment and including a flat oblong rectangular base or bottom wall 2, two parallel side walls 3 and 4 and two parallel end walls 5 and 6 perpendicular to the base and secured thereto, and a top wall 7 parallel to the base and extending between the upper edges of the side and end walls and hinged by hinges 8 to the upper edge of the side wall 4 to open upwardly. The base 2 is made of metal or other rigid material and is provided upon its inner or upper side with a continuous marginal flange 9 and with stiffening ribs 10.

For the sake of convenience, it will be assumed throughout the following description that the main casing 1 is arranged with its base 2 in a horizontal position and with its side and end walls 3, 4, 5 and 6 extending vertically upwardly therefrom, although it is to be understood that the machine may be successfully operated with the base 2 in any desired position.

Within the main casing 1 are arranged coöperating mechanisms comprising means for directing or projecting light in predetermined pathways in the casing, means for guiding and for continuously actuating a properly sensitized photographic medium in such a manner as to move the said medium continuously through a predetermined path and means for successively and continuously presenting predetermined areas of the said medium to the action of the light rays of the lens system and for maintaining the said areas for predetermined periods in optically stationary relationship to the said lens system or light projecting means, as will appear hereinafter.

The means for directing or projecting light into the casing 1 in a predetermined path includes any suitable objective lens or system of lenses 11, preferably arranged in a horizontal tube 12 which projects perpendicularly and is fully movable longitudinally through an aperture 13 provided therefor through the lower portion of the side wall 4 of the casing and approximately midway between the end walls 5 and 6. The inner end of the tube is preferably threaded into a vertical plate 14 which is adjustably supported upon any suitable mounting 15 which will permit of the focusing of the lens system by a movement of the tube 12 longitudinally, and which will permit of the adjustment of the tube vertically and laterally. A light-tight flexible bellows 16 surrounds the tube 12 and is secured at its inner end to the outer surface of the plate 14 and is secured at its outer end to the inner surface of the side wall 4. The outer end of the tube 16 is covered by the usual light-tight cap 17 or equivalent device which is removed when it is desired to operate the device either as a camera, or as a projector.

Detachably mounted upon the top wall 7 of the main casing 1 are a light-tight film supply magazine 18, and a light-tight film receiving magazine 19, (see Figs. 2 and 3). These two magazines are identical in construction and each includes a casing comprising a flat rectangular oblong bottom wall 20, two parallel approximately square vertical side walls 21, two parallel vertical end walls 22, and a top wall 23. One of the side walls 21 is hinged by hinges 24 at its upper edge to one edge of the top wall 23 to open outwardly, and is provided adjacent its lower edge with a rotatable latch 25 arranged to engage a corresponding keeper 26 secured to the bottom wall to hold the side wall closed. The other side wall 21, the bottom wall 20, the end walls 22 and the top wall 23 are rigidly secured together. Each of these magazines 18 and 19 contains the usual removable reel or spool 27 which rotatably surrounds and is arranged to be rotated by and in unison with a horizontal spindle 28 which extends centrally through the fixed side wall 21 of the magazine, and the outer end of which is enlarged and provided with a flat diametrically arranged lug 29 adapted to be engaged by means hereinafter described whereby the spindle 28 and its spool may be continuously rotated. These two magazines 18 and 19 are preferably arranged in longitudinal alinement so that a horizontal line drawn through the central portion of the two reels 27 will be in vertical alinement with the principal axis of the system of lenses 11. The bottom wall 20 of each of these magazines is provided at its end with two transverse film openings 30 and 31, and the top wall 7 of the main casing is provided with two film openings 32 and 33 adapted to register respectively with the openings 30—30 through the bottom walls of the magazines.

A strip of film 34, which is secured at one end to the spool 27 in the supply magazine 18, is passed downwardly from the interior of the supply magazine 18 through the openings 30 and 32 and into the main casing, and then through film guiding and actuating mechanism, to be hereinafter described, and upwardly through the openings 33 and 30 to the receiving magazine 19, and is secured at its other end to the spool 27 of the receiving magazine 19. When this device is to be used as a camera the strip 34 consists of a suitably sensitized photographic film or medium, but when this device is to be used as a "projector" a strip of film provided with a series of rectangular photographic positives representing successive phases of motion is substituted for the sensitized film.

A layer 35 of felt or other suitable yielding light-proof material is interposed between the bottom walls 20 of the magazines and the top walls 7 of the main casing, this layer being provided with suitable openings 36 arranged to register with the openings 32 and 33 of the top wall 7 to permit of the movement of the film 34. Yielding light shields 37 and rollers 38 are arranged within the magazines to coöperate with the film for obvious purposes.

For detachably clamping each magazine in an operative position, each magazine is provided on the outer surface of each side wall with a cleat 39 which is rigidly secured to the side wall and which extends parallel to and adjacent the lower edge thereof. This cleat is provided upon its outer surface with a longitudinally extending transversely convex rib or head 40. The cleat 39 upon the lower portion of the hinged side wall or door 21 is formed in two longitudinally alined sections spaced apart centrally of the door to avoid interference with the latch 25. A plurality of tempered spring steel clips 41 are arranged in opposed pairs to coöperate with the cleats 39 to clamp each magazine in position. Each of these spring clips 41 includes a flat horizontal base portion which is rigidly secured to the upper surface of the top wall 7 of the main casing. Each of these spring clips also includes a yielding portion integral with the base portion and normally extending substantially vertically upwardly therefrom, and the upper portion of which terminates in a crimp or corrugation 42 having a transversely convex inner surface arranged to engage over the corresponding rib 40. In the form shown two pairs of these spring clips 42 are secured to the top wall 7 to hold each film magazine in position, and the construction of the spring clips is such that the crimps 42 are forced slightly outwardly by the beads 40 and react upon the beads to hold the magazine against horizontal movement transversely, and to clamp the magazine downwardly against the layer of yielding material upon which the magazine is mounted. To position the magazines longitudinally and to hold the same against longitudinal movement, two oppositely arranged parallel metal cleats 43 are rigidly secured to the upper surface of the top wall 7 of the main casing in such positions as to engage against the lower portions of the outer end walls of the magazines when the magazines are arranged in operative positions.

In this construction it is evident that either magazine 18 or 19 may be quickly and conveniently removed from an operative position merely by lifting the magazine with the slight force necessary to overcome the action of the spring clips 41, and the magazine may be returned to an operative position simply by pressing the magazine downwardly between the spring clips, thus causing the beads 40 to engage against the upper surfaces of the crimps 42 and force the crimps outwardly until the beads have passed downwardly over the crimps and allowed the crimps to engage against the upper surfaces of the beads to clamp the magazine in position as shown. It is also to be noted that the magazines are reversible to permit either magazine to be used as a receiving magazine and the other as the supply magazine.

For guiding consecutive portions of the film 34 successively through a predetermined path in a horizontal plane spaced above the horizontal plane of the lens 11, a comparatively thin flat horizontal rectangular film platform or plate 44 (see particularly Figs. 20 to 24) of steel or other suitable metal or material is rigidly secured against the under side of a flat oblong rectangular horizontal rigid frame 45 comprising two parallel side walls 46 and 47 and two parallel end walls 48 and 49, the side walls 46 and 47 being spaced apart at a distance slightly greater than the width of the film 34. This frame 45 is held in a fixed position by two vertical brackets 50 and 51, the lower ends of which are integral with or otherwise rigidly secured to the side wall 46 of the frame 45, and the upper ends of which are rigidly but detachably secured to a transverse yoke 52 (see Figs. 1 and 2) by means of screws 53 extending through the yoke and threaded into the brackets 50 and 51. The yoke 52 is substantially in the form of an inverted U, and the ends of the yoke are rigidly but detachably secured to the upper ends of two posts 54 and 55 (see Figs. 2, 4 and 5) which project upwardly from the base 2 and are preferably integral therewith or otherwise rigidly secured thereto. The film platform 44 is preferably arranged in a horizontal plane and with its longitudinal axis substantially coincident with a vertical plane with which the principal axis of the lens system 11 coincides, (see Figs. 1 and 2), and is provided with a view aperture 56 (see Fig. 24) which is preferably in the form of a parallelogram (see Fig. 24) having two edges 57 and 58 parallel to the longitudinal axis of the plate 44 and two edges 59 and 60 parallel to each other but extending obliquely with respect to the longitudinal axis of the plate 44. A thin flat shield 61 (see Figs. 24 and 25) is rigidly secured between the brackets 50 and 51 to the side wall 46 by screws 62 extending through a marginal flange 63 provided on the shield, and a corresponding flat shield 64 is rigidly secured to the other side wall 47 by screws 65 extending through a marginal flange 66, the under surfaces of these shields being preferably substantially horizontal and flush with the under surface of the platform 44.

To compensate for slight variation in the width of the film 34 and to hold the film always in proper longitudinal alinement with one of its edges in sliding engagement with the inner edge of the side wall 46, a thin flexible strip 67 (see Figs. 24 and 25) preferably of tempered spring steel is arranged to extend horizontally in a horizontal direction and transversely in a vertical direction just inside of and normally substantially parallel to the inner surface of the other side wall 47 of the frame 45, the upper edge of the strip being spaced slightly below the upper surface of the side wall 47. The lower longitudinal marginal portion of the strip 67 engages loosely in a longitudinal slot 68 provided therefor through the platform 44, and the lower edge of the strip is preferably substantially flush with the lower surface of the platform. This strip 67 is rigidly secured to the inner ends of a plurality of small cylindrical horizontal pins or plungers 69 which project snugly but slidably through the side wall 47 and flange 66. The outer ends of these pins are threaded and provided with suitable nuts 70 which are adjustable to draw the pins outwardly or to limit the inward movement of the pins. Surrounding the inner ends of the pins 69 and arranged in suitable recesses 71 provided therefor in the inner surface of the side wall 47, are a series of spiral springs 72 which are normally held under a state of compression tending to force the strip 67 inwardly and against the inner wall of the slot 68. The ends 73 of the strip 68 are preferably turned backwardly to avoid an interference with the edge of the film and the inner surface of the side wall 47 is provided with a longitudinal recess 74 arranged to receive the strip 67 when the strip is in its outermost position and to hold the strip with its inner surface substantially flush with the inner surface of the side wall 47. The outer wall of the slot 68 is preferably substantially flush with the wall of this recess 74. When this device is in operation the steel strip 67 is yieldingly pressed against the corresponding edge of the film 34 by the spiral spring 72 and is held by the edge of the film out of contact with the walls of the slot 68 and the wall of the recess 74.

For pressing consecutive portions of the film 34 successively flat against the upper surface of the platform 44, a presser plate 75 (see Figs. 20 to 23) is arranged above the frame 45 to oscillate with respect thereto upon two links 76 and 77 normally extending upwardly and obliquely therefrom and the upper ends of which are pivotally connected to the two brackets 50 and 51 respectively by screws 78 and 79, and the lower ends of which are pivotally connected respectively to two flat lugs 80 and 81 integral with the presser plate 75 by screws 82 and 83. This presser plate 75 is substantially the same width as the frame 45 but is shorter in length and is provided on its under side with longitudinal marginal shoulders 84 and 85 to permit the central under portion of each end of the frame of the presser plate to slidably engage between the side walls of the frame 45. Extending across the outer end of the presser plate 75 is a cylindrical roller 86 which is arranged between two lugs 87 and 88, projecting upwardly from and integral with the presser plate, to rotate about a horizontal axis fixed with respect to the presser plate 75 upon a horizontal stud 89, the opposite ends of which project snugly through the two lugs and the central portion of which extends loosely through the roller 86. This stud 89 is provided at one end with a head 90 and at its other end with a nut 91 threaded thereon whereby the stud is held in fixed relationship to the lugs. This roller 86 is arranged to project slightly below the under surface of the presser plate to engage against the upper surface of the film 34. The other end of the presser plate 75 is provided with a similar but smaller roller 92 which is mounted between two lugs 93 and 94, projecting upwardly from and integral with the presser plate, to rotate about a horizontal axis fixed with respect to the presser plate, upon a stud 95, the opposite ends of which project snugly through the lugs 93 and 94 and the central portion of which projects loosely through the roller 92, the stud being provided at one end with a head 96 and at its other end with a nut 97 threaded thereon. This smaller roller is also arranged to project slightly below the under surface of the presser plate and to engage against the upper surface of the film 34. The two rollers 86 and 92 are normally held yieldingly in engagement with the upper surface of the film 34 to press the film against the upper surface of the platform 44 by means of a spiral spring 98 one end of which is secured to the bracket 50 and the other end of which is secured to an arm or pin or stud 99 projecting horizontally outwardly from and secured to the presser plate 75. The presser plate 75 is provided with an aperture 100 which is normally substantially in alinement with the view aperture 56 through the platform 44.

As additional means for holding the film 34 flat against the platform 44 an approximately U-shaped floating strip 101 (see Fig. 26) of tempered spring steel may be arranged in the aperture 100 of the presser plate. This floating strip preferably comprises two substantially horizontal parallel portions 102 and 103 extending within the aperture 100 and longitudinally of the plate 75, two upwardly extending portions 104 and 105, and a transverse portion 106 connecting the upwardly extending portions. The free end of the portion 102 of this floating strip is bent upwardly as at 107 and then outwardly as at 108 to engage over the upper surface of the plate 75. The transverse portion 106 is arranged obliquely with respect to the parallel portions 102 and 103 and rests upon the upper surface of the plate 75 along the oblique edge 109 of the aperture 100 to coöperate with the outwardly turned end 108 to hold the floating strip in position when the plate 75 is raised. The upwardly extending portions 104 and 105 of the floating strip engage loosely in recesses 110 provided therefor in the ends of the oblique wall 109 of the aperture 100. The parallel portions 102 and 103 of the floating strip are normally pressed substantially flat against the upper surface of the film and on opposite sides of the view opening 56 when in operation by two longitudinally curved tempered spring steel arms 111 and 112 (see Fig. 27) which are integral with the opposite ends of a substantially flat steel connector 113 which is rigidly secured to the upper surface of the plate 75 by screws 114.

As a further means for holding the film 34 flat against the upper surface of the platform 44, an auxiliary cylindrical roller 115 (see Figs. 20 to 23) is arranged to rotate about a horizontal pivot 116 which is terminally secured in two branches 117 (see Fig. 1) of the free end of an arm 118 which is arranged to be swung into or out of engagement with the upper surface of the film 34 above the view aperture 56 about a horizontal pivot 119, which extends loosely through the other end of the arm 118, and the ends of which are rigidly secured in a bracket 120 which is rigidly secured to the presser plate 75. This auxiliary roller 115 is preferably slightly longer than the width of the view aperture 56 and is arranged to overhang the opposite side walls 57 and 58 of the view aperture and to engage the film between the parallel portions 102 and 103 of the floating spring strip 101. This auxiliary roller 115 is used only when the machine is used as a camera. When the machine is used as a projector the auxiliary roller 115 and its arm 116 are moved out of operative position (as shown in Fig. 22), or are omitted, all of the other elements for guiding the film being retained.

For simultaneously maintaining consecutive portions of the film 34 in optically stationary relationship to the lenses 11 as these portions move across the aperture 56 in the plate 44, means are provided comprising a plurality of compensating units so arranged as to be successively movable into and out of an operative or active position. Each of these compensating units comprises a rigid block or link 121 (see Figs. 1, 2, 11 and 13), and three flat rectangular reflecting mediums 122, 123, and 124, having opposed plane reflecting surfaces 125 and 126 and 127 respectively. These reflecting mediums, for convenient future reference, may be arbitrarily named, the primary reflecting medium, 122, the secondary reflecting medium 123, and the relatively movable reflecting medium 124. Each of these reflecting mediums consists preferably of a flat plate of metal or of any other suitable reflecting material, and is preferably rectangular in outline. The primary medium 122 and the secondary medium 123 are rigidly secured in a fixed relation with respect to each other and to the corresponding link 121 in suitable holders 128 and 129, which diverge outwardly from and which are integral and rigid with a lug 130 which projects horizontally and obliquely outwardly from, and which is rigid with the link 121.

The relatively movable reflecting medium 124 is superimposed upon and rigidly secured to a slider 131 by means of two cleats or brackets 132 and 133, which are rigidly secured to the slider by means of screws 134 and 135. The slider 131 is arranged to reciprocate in a predetermined horizontal path toward and away from the secondary reflecting medium 123 upon two rigid parallel horizontal guides 136, 136, the inner ends of which are recessed and are securely and rigidly clamped between two rigid extensions 137, 137 of two vertical side plates 138, 138, by means of screws 139 and pins 140. The inner ends of the side plates 138 are rigidly secured to the opposite sides of the outer end of the lug 130 by means of screws 141 and pins 142. Each side plate 138 is provided upon its inner side with a longitudinally vertical transversely rectangular recess 143 (see Fig. 15) to avoid any interference with the light reflected upwardly from the primary reflecting surface 122. The inner ends of the guides 136, 136 are connected by a cross piece 144 integral therewith, and the outer ends of the guides are connected by a cross bar 145 detachably and rigidly secured thereto by two screws 146, 146. The two guides 136 engage snugly in two parallel horizontal guideways 147, provided therefor in the walls of the slider 131 and the slider thus held against transverse movement with respect to the guides but is free to move longitudinally of the guides. The flat reflecting surfaces 125 and 126 of the primary reflecting medium 122 and secondary reflecting medium 123 are arranged to diverge outwardly with respect to the link 121 and to coincide respectively with planes which are perpendicular to each other, and which intersect in a horizontal line, and which make angles of 45 degrees respectively with a horizontal plane. The center of the primary reflecting surface 125 is preferably arranged to coincide with a horizontal plane, passing through the principal axis of the lens system, and the center of the secondary reflecting surface 126 is arranged vertically above the center of the primary reflecting surface 125. The relatively movable reflecting medium 124 is arranged so that its flat reflecting surface 127 will always be opposed and parallel to the secondary reflecting surface 126 and so that its center will always be in horizontal alinement with the center of the secondary reflecting surface 126.

In the construction of the compensating units, instead of using three separate plates to form the three flat reflecting surfaces 125, 126 and 127 as hereinbefore described and as shown in Figs. 1, 2, 11 and 12, these reflecting surfaces may be formed by two glass prisms 148 and 149 as shown in Figs. 15, 16 and 17. One, 148, of these prisms is arranged vertically and is secured between the holders 128 and 129 and the side plates 138, and is provided with a vertical surface 150 and with flat oblique end surfaces 151 and 152, the end surfaces corresponding in form and arrangement respectively with the primary reflecting surface 125 and the secondary reflecting surface 126 hereinbefore described. The other prism 149 is secured in the slider 131 and is provided with a vertical surface 153, with a flat oblique lower surface 154, the latter corresponding in form and arrangement with the hereinbefore described relatively movable reflecting surface 127, and with a horizontal surface 155. In the operation of the modified form of this invention the light strikes the oblique reflecting surfaces 150, 151 and 152 successively at such an angle that there is a total reflection of the light in each case, and the action of the prisms 148 and 149 on the light is substantially the same as that of the flat reflecting mediums 122, 123 and 124. The oblique surfaces 151, 152, and 154 of the prisms may be coated with any suitable reflecting medium 156 such for instance as is used on the backs of mirrors although this would seem to be unnecessary.

For the purpose of diminishing the time of exposure of each part of the sensitized film when the device is used as a camera, each relatively movable reflecting medium 124, or its prism 149 may be provided with a horizontal screen 157 rigidly secured above the reflecting medium to the corresponding slider 131 and provided with an oblong rectangular slot 158, as shown in Figs. 13 and 14, 18 and 19. This screen 157 acts in a manner similar to that of a focal plane shutter in reducing the time of exposure of each part of the film. In the construction shown in Figs. 1, 2, 11, 12 this screen 157 is omitted and the construction is such that when a relatively movable reflecting medium is in vertical alinement with the view aperture 56 of the film plate, all of the light that is reflected upwardly from the reflecting medium is permitted to pass through the view aperture and a maximum degree of exposure is thus obtained.

When this device is to be used as a camera, a hollow cover or box 159, having all of its interior surfaces painted a dead black, is preferably placed over the presser plate 75 to inclose the view aperture 56 of the film plate and incidentally the auxiliary roller 115 and its arm 118. This hollow cover 159 acts to absorb any light which has passed upwardly through the sensitized film and through the view aperture 56, and thus prevents the film from being "light struck" by light which might possibly otherwise be reflected downwardly against the film after having passed upwardly through the film. When the device is used as a projector this hollow cover 159 is removed as will appear hereinafter.

For guiding the compensating units to move in an endless path in a horizontal plane, the links 121 are connected by vertical pivots or pintles 160, having heads 161, to form a continuous chain, which is arranged to surround and engage slidably between two rigid guide blocks 162 and 163 which are securely clamped together, one above the other, by means of bolts 164. These guide blocks 162, 163 are arranged approximately centrally within the main casing 2 and in top plan view are rectangular and oblong arranged obliquely with respect to the main casing 2. The lower side block 162 rests upon and is rigidly secured to central portions of two outwardly arranged rigid yokes 165 and 166 which extend outwardly and upwardly from the block and the outer ends of which extend horizontally in a horizontal plane spaced below the plane of the guides 136 and are rigidly secured to four vertical posts 167, 168, 169 and 170, which project upwardly from the base plate 1 of the main casing 2, by means of screws 171, 172, 173 and 174.

For causing the sliders 131 carrying the relatively movable reflecting mediums 124 to reciprocate toward and away from the secondary reflecting mediums 123 as the links 121 are moved through an endless path, as will appear hereinafter, an endless horizontal stationary track 175 is arranged within the main casing 2, and surrounding the guide blocks 162 and 163, and engages against the horizontal flat under surfaces of the sliders. This track is provided upon its upper side with a longitudinal endless groove 176 rectangular in transverse section forming a guideway, and each slider 131 carries upon its under side a vertical cylindrical follower 177 which fits loosely in the groove 176, and which is arranged to rotate about a vertical axis fixed with respect to the slider 131 upon the lower end of a vertical stud 178 which is rigid with the slider 131. Under the action of centrifugal force the follower 177 is pressed outwardly and rolls against the outer vertical wall of the groove 176 as the links 121 are moved through their endless path, as will appear hereinafter.

For supporting the track 175, the track 175 is provided with four outwardly projecting horizontal lugs 179, 180, 181 and 182 integral therewith or rigidly secured thereto which are arranged to rest upon the upper surface of the outer horizontal ends of the yokes 165 and 166 and is secured in position by means of the screws 171, 172, 173 and 174 which extend through apertures 183, 184, 185 and 186 provided therefor in the lugs.

For guiding the relatively movable reflecting mediums to move consecutively through the active portion of their path in a direction which is the resultant of a component movement parallel to and at the same rate as the rate of movement of the photographic medium over the plate 44, and a component movement transversely of the photographic medium and at the same rate of movement of the links 121, the track 175 is provided with a straight portion 187 (see Fig. 4) which extends obliquely beneath the plate 44 at a suitable angle predetermined by the ratio between the rate of movement of the photographic medium longitudinally over the plate 44 and the rate of movement of the links 121 while carrying the relatively movable reflecting mediums through the action portion of their path.

To permit of a rotative adjustment of the track 175 to position the straight oblique portion 187 of the track with exactness, the track is preferably pivoted to swing through a limited arc about the screw 174 as an axis and the apertures 183, 184 and 185 through the lugs 179, 180 and 181 are elongated and arcuate in shape about the screw 174 as an axis to permit of this adjustment of the track. For conveniently effecting this adjustment, a threaded pin 188 is pivotally connected at one end to the track 175 and extends loosely through a bifurcated bracket 189 which is rigidly secured to the yoke 166, and a thumb nut 190 is threaded over the pin between the two branches of the bracket. The track 175 is normally clamped rigidly in position by the screws 171, 172, 173 and 174, but when it is desired to adjust the position of the track, the screws 171, 172 and 173 are loosened and the thumb screw 190 is turned in the desired direction to swing the track about the screw 174 as an axis until the adjustment is effected, whereupon the screws 171, 172 and 173 are then tightened to clamp the track in position.

For supporting the chain of links 121 to move in a continuous path around the guide blocks 162 and 163, a pair of flat horizontal coaxial rollers 191 and 192 (see particularly Figs. 8 and 9) are rigidly secured to a vertical spindle 193 which is terminally supported for rotation in two bearing blocks 194 and 195 which are rigidly secured to one end of the lower guide block 162 and to the corresponding end of the upper guide block 163 respectively by screws 196—196. A similar pair of rollers 197 and 198 are rigidly secured to a spindle 199 which is terminally mounted to rotate in bearing blocks 200 and 201 which are rigidly secured to the opposite ends of the guide blocks 162 and 163 respectively by means of screws 202. The upper surfaces of the lower rollers 197 are arranged to engage against the under surfaces of the links 121 and the under surfaces of the upper rollers 195 and 198 are arranged to engage against the upper surfaces of the links 121. The outer portions of the peripheral walls of these rollers are arranged to engage respectively snugly against the lower and upper ends of the pivots 160 and 161 connecting the links 121, and the inner peripheral portions of all of these rollers respectively engage freely in suitable recesses 203 provided therefor in the end walls of the guide blocks 162 and 163.

The construction and arrangement of the rollers 191 and 192, 197 and 198, are such that the chain consisting of the links 121 is stretched tightly around the rollers and is arranged to travel in an endless path in a substantially horizontal plane, the opposite portions of the chain between the rollers, being arranged to travel in parallel paths in recesses 204 and 205 provided therefor in the opposite side walls of the guide blocks 162 and 163.

To prevent displacement of the links 121 from their predetermined path of movement, four substantially flat vertical guide plates 206, 207, 208 and 209 are arranged in oppositely disposed pairs outside of links 121. Two, 206 and 207, of these guide plates are secured to the opposite side walls of the lower guide block 162 by screws 210, and the upper edges 211 of these two guide plates are parallel and in the same horizontal plane and engage against the under surfaces of the lugs 130 of the links 121. The other two, 208 and 209, of these guide plates, are secured to the upper portions of the side walls of the upper guide block 163 by means of screws 212 and the lower edges 213 of these guide plates are parallel and arranged in the same horizontal plane and spaced slightly above the upper surfaces of the lugs 130 of the links 121.

For pressing the lugs 130 of the links 121 yieldingly against the upper edges 211 of the lower guide plates 206 and 207, a pair of flat comparatively rigid substantially horizontal presser plates 214 are arranged to reciprocate vertically in recesses 215 provided therefor in the lower edges 213 of the upper guide plates 208 and 209. These presser plates 214 are rigidly secured to the lower ends of vertical pins 216, the upper portions of which engage snugly but slidably in suitable recesses 217 provided therefor in the upper guide plates 208 and 209. Between each presser plate 214 and the upper wall of its recesses is a bowed tempered steel spring 218 provided with an oblong aperture 219 through which the pins 217 freely pass. These springs 218 normally press the presser plates 214 against the upper surfaces of lugs 212 and hold the under surfaces of the lugs 212 yieldingly in engagement with the upper edges 211 of the lower guide plates 206 and 207.

For pressing the links 121 outwardly against the inner flat surfaces of the guide plates 206, 207, 208 and 209, four presser plates 220, similar to the presser plates 214 just described, are arranged to engage in lateral horizontal recesses 221 in the guide blocks 162 and 163 and are similarly provided with pins 222 and springs 223 which yieldingly press the presser plates 220 against the inner lateral surfaces of the links 121 and force the outer lateral surfaces of the links 121 yieldingly against the inner flat surfaces of the guide plates 206, 207, 208 and 209.

For giving a continuous movement to the hereinbefore described compensating units and to the hereinafter described film feeding mechanism, a vertical main driving shaft 224 projects snugly but rotatively through vertically alined apertures 225 and 226 provided therefor in the lower bearing block 162 and the upper bearing block 163 respectively. The lower end of this bearing shaft 224 engages snugly but rotatively in a suitable end bearing 227 which projects upwardly from and is rigid with the base 2 of the machine, the lower end of the main driving shaft 224 being preferably held against downward movement by a ball 228 or other antifriction means, arranged in the bearing 227. The main shaft 224 is actuated by means of a horizontal crank shaft 229 upon which is rigidly secured a worm 230 which meshes with a corresponding worm gear 231 surrounding the main shaft 224 and below the lower guide block 162, the worm gear 231 being provided with a hub 232 integral therewith which is rigidly secured to the shaft 224 and in sliding engagement with the lower surface of the lower guide block 162 by means of a set screw 233, whereby the hub 232 holds the worm gear 231 in fixed relation to the shaft 224 and holds the shaft 224 against upward movement. The outer portion of the crank shaft 229 extends through the end wall 5 of the main casing 1 and is mounted to rotate in a suitable bearing projecting upwardly from and rigid with the base 2. The inner end of the crank shaft 229 is mounted to rotate in a bearing 235 rigidly secured to the under side of the yoke 165 by screws 236. The crank shaft 229 is held against outward movement by a collar 237 rigidly secured thereto and which engages against the inner side of the fixed bearing 234. The crank shaft 229 may be actuated by means of a crank 238 rigidly secured to the outer end thereof and provided with a handle 239, or the crank shaft may be rotated by a suitable motor or by any other suitable means.

For transmitting movement from the main shaft 224 to the links 121, each link 121 is provided upon its inner surface with a flat vertical rectangular rack plate 240 rigidly secured thereto by means of screws 241. Each of these rack plates 240 is provided along its upper and lower edges with inwardly facing obliquely and oppositely arranged rack teeth 242 and 243, forming a herring bone pattern. Surrounding the main shaft 224 rigidly secured thereto by means of a key 244, is a spiral gear 245 which is arranged in a suitable aperture 246 provided therefor between the lower and upper guide blocks 162 and 163. This spiral gear 245 is of such a diameter and so arranged that it meshes at diametrically opposite points with the lower rack teeth 242 of oppositely disposed links. This spiral gear 245 is provided with an upwardly extending hub 247, which engages loosely in the aperture 246 and upon the upper end of which surrounding the main shaft 224 is mounted a second spiral gear 248 which is rigidly secured to the hub 247 by screws 249. This second or upper spiral gear 248 is of the same diameter as the lower spiral gear 245 and is arranged in the aperture 246 to mesh at diametrically opposite points with the upper rack teeth 243 of oppositely disposed rack plates 240. The construction is such that as the main shaft 224 is rotated, the spiral gears 245 and 248 engage the rack teeth 242 and 243 of oppositely disposed links successively to move the links 121 continuously in a predetermined endless path.

For continuously moving consecutive portions of the film 34 successively over the aperture 56 in the plate 44 synchronously with respect to the movement of the links 121, a bevel gear 250 surrounds and is rigidly secured to the upper end of the main shaft 224. Meshing with this bevel gear 250 is a corresponding bevel gear 251 which is rigidly secured on one end of a horizontal spindle 252 which is mounted to rotate about a fixed axis coincident with its longitudinal axis in a bushing 253 which fits tightly in a bearing box 254 integral with the stationary yoke 52. The spindle 252 is held against longitudinal movement in one direction by the bevel gear 251 bearing against the end of the bushing 253 and is held against longitudinal movement in the opposite direction by a collar 255 which surrounds the spindle and engages against the opposite end of the bushing 253, the collar 255 being held rigidly but removably in position by a set screw 256. The spindle 252 projects outwardly from the collar 255 and is provided outside the collar with a reduced cylindrical portion 257 forming with the main portion 252 an outwardly facing annular shoulder 258. Loosely surrounding the reduced portion 257, is a sleeve 259 which is provided at its inner and outer ends with two sprocket wheels 260 and 261 integral therewith and adapted to engage in two rows of marginal perforations 262 provided therefor in the film 34.

For effecting either an automatic longitudinal movement of the film 34 in response to the rotation of the main shaft 224, or a manual longitudinal movement or adjustment of the film independently of the movement of the main shaft 224, a clutch is provided which comprises a tubular clutch member 263 which surrounds the outer end of the reduced portion 257 of the spindle 252. This clutch member 263 is slidable longitudinally with respect to the reduced portion 257 but is held against rotation with respect thereto by a key 264 forming part of a metal washer 265 interposed around the reduced portion 257 between the inner end of the clutch member 263 and the outer end of the outer sprocket 261 and rigidly secured to the inner end of the clutch member by means of a rivet 266. This key 264 engages slidably in a longitudinal keyway 267 provided therefor in the reduced portion 257. The clutch member 263 is provided with a pin 268 which is rigid therewith and projects inwardly therefrom and is adapted to engage in any one of a plurality of recesses 269 provided therefor in the outer end of the sleeve 509 to transmit rotary motion from the clutch member to the sprockets. The clutch member 263 is normally pressed toward the outer sprocket 261 to hold the pin 268 in engagement in its recess 269, by means of a spiral spring 270 arranged within the clutch member 263 and surrounding the outer end of the reduced portion 257, the inner end of this spring being in engagement with an annular internal shoulder 271, provided therefor on the clutch member and the outer end of the spring being normally pressed inwardly by a nut 272 which is threaded upon the outer end of the reduced portion 257. The construction is such that when it is desired to have the film 34 actuated by the rotation of the spindle 252, the clutch member 263 is permitted to rest with its pin 268 in engagement in one of the recesses 269, as shown in Fig. 29, but when it is desired to move the film 34 when the spindle 252 is at rest, clutch member 263 is thrown outwardly to disengage the pin 268 from the aperture 269 to permit the sprockets 260 and 261 to be rotated independently of the spindle 252.

For holding the film 34 in engagement with the sprockets 260 and 261, means are provided comprising a collar 273, interposed between the spindle collar 255 and the adjacent end of the bearing box 254, and loosely surrounding the stationary sleeve 253. This collar is rotatively adjustable with respect to the sleeve 253 and is held rigidly in any desired position of adjustment by a set screw 274 which is threaded through the collar and engages against the sleeve. This collar is provided with a lug 275 projecting outwardly therefrom which terminates in a horizontal cylindrical portion 276 through which extends a horizontal pivot 277 upon the outer end of which is mounted to oscillate two arms 278 and 279, the pivot 277 extending through one end of each arm. The free ends of arms 278 and 279 are provided with horizontal spindles 280 and 281 upon which are loosely mounted two idlers 282 and 283, each of which is provided with two annular recesses 284—284 adapted to receive the teeth of the sprockets 260 and 261, and with two annular recesses 285 adapted to receive two endless yielding belts 286 adapted to throw the idlers 282 and 283 toward each other and to press the film into engagement with the sprockets 260 and 261 at diametrically opposite points. When it is desired to remove the film from the sprockets, the arms 278 and 279 may be swung in opposite direction about the pivot 277 to move the idlers 282 and 283 away from the sprockets, the belts 286 being of sufficiently yielding character to permit of this action.

For taking up the film after it is delivered from the sprockets 260 and 261, a bevel pinion 287 is rigidly secured to the inner and horizontal spindle 252 and meshes with a corresponding bevel pinion 288 rigidly secured upon the lower end of a vertical spindle 289 which is mounted to rotate about a fixed vertical axis in a bracket 290 which depends from and is rigidly secured to the top wall 7 of the main casing. Upon the upper end of the vertical spindle 289 is rigidly secured a beveled pinion 291 which engages a corresponding bevel pinion 292 rigidly secured on one end of a horizontal spindle 292' which is arranged to rotate about a fixed horizontal axis in the bracket 290 and which has rigidly secured to its other end a beveled pinion 293 which engages a corresponding bevel pinion 294 which is rigidly secured to the lower end of a vertical spindle 295 which extends upwardly through the top wall 7 of the main casing, and through a rigid standard 296 which is mounted upon and rigidly secured to the top wall 7. Rigidly secured to the upper end of the latter vertical spindle 295 is a beveled gear 297 which engages a corresponding bevel gear 298, which loosely surrounds a horizontal spindle 299 and which is integral with a disk 300 which also loosely surrounds the spindle 299. The spindle 299 is rotatively supported adjacent one end by an arm 301 which projects upwardly from the standard 296 and is held against movement longitudinally outwardly through the arm 301 by a sleeve 302 which surrounds the spindle between the arm 301 and the bevel gear 298 and is rigidly but detachably secured to the spindle by a set screw 303. The spindle 299 is rotatively supported at its other end by a screw 304 which is threaded through an arm 305 which projects upwardly from the standard 296, the screw having a conical inner end 306 which engages in a corresponding recess provided centrally in the outer end of the spindle 299.

For transmitting motion from the disk 300 to the spindle 299 a friction washer 307 of leather or other suitable material loosely surrounds the spindle 299 and is secured to the inner surface of the disk 300 and frictionally engages the inner surface of a corresponding disk 308 which surrounds the spindle 299 and is held against rotation with respect thereto but is movable longitudinally thereof, the disk 308 being provided with a pin or key 309 which engages slidably in a longitudinal keyway 310 provided therefor in the spindle 299. The disk 308 is normally pressed against the friction washer 307 by a spiral spring 311 which surrounds the outer end of the spindle 299 and the inner end of which engages against the washer 311 which engages against the outer end of the disk 308. The outer end of the spring 311 is normally pressed inwardly by a nut 312 which is threaded upon the outer end of the spindle 299 and which is adjustable to vary the pressure of the disk 308 against the friction washer 307. The inner end of the spindle 299 is enlarged as at 313 and is provided with a transverse slot 314 adapted to receive loosely the flat lug 29 provided therefor upon the outer end of the reel spindle of the film receiving magazine.

The construction is such that the rotation of the vertical spindle 295 is transmitted frictionally through the friction washer 307 to the spindle 299 and thence to the reel spindle. The friction washer 307 is always rotated at a rate greater than the rate of rotation of the reel spindle, the difference in speed between the friction washer 307 and the reel spindle 277 being taken up by the slipping of the friction washer 307 rotatively with respect to the disk 308, to take up the film as fast as it is fed toward the receiving magazine by the sprockets 260 and 261, and to keep the film 34 under a slight tension.

In the operation of this device as a camera, when it is desired to make an exposure the cap 17 is removed from the objective lens system 11 and the crank 238 is rotated continuously, either manually or otherwise, at any suitable speed. The compensating units, each including three reflecting mediums 122, 123 and 124, are thus caused to pass successively through the active portion of their path, and the film 34 is caused to move continuously longitudinally over the view aperture 56 of the film plate. The construction is such that during the entire time that each compensating unit is moving along the straight portion 187 of the track 175, and through the active portion of its path, the three reflecting surfaces 125, 126 and 127 of the three reflecting mediums are maintained respectively in planes perpendicular to a vertical plane coincident with the longitudinal or principal axis of the lens system, and the parallel guides 136 and 137 for the relatively movable reflecting medium 124 are maintained in parallel relation to the longitudinal axis of the view aperture 56 and the longitudinal axis of the lens system. The arrangement of the oblique straight portion 187 of the track 175 with respect to the view aperture 56 is such that each relatively movable reflecting medium 124 is caused to move obliquely and horizontally inwardly across the view opening 56 in such a manner that the center of the relatively removable reflecting medium moves in a straight line passing through a point vertically below the center of the view opening and in a direction which is the resultant of a component movement of the secondary reflecting medium in a direction parallel to and at the same rate as the movement of the sensitized film 34 longitudinally of the view aperture, and a component transverse movement at right angles to the longitudinal axis of the view aperture, and at a rate having a given ratio to the rate of movement of the film. The primary reflecting medium 122 and the secondary reflecting medium 123 are simultaneously moved along an oblique line converging with respect to the line of movement of the relatively movable reflecting medium in such a degree that as the light from the lens system is reflected from the primary reflecting medium 122 vertically to the secondary reflecting medium 123, then horizontally to the relatively movable reflecting medium 124 and then through the view aperture 56 and against the under surface of the film 34, a constant focal distance is maintained between the objective lens system and the corresponding exposed portion of the under surface of the constantly moving film, and the constantly moving exposed portion of the film is held optically stationary with respect to the objective lens system 11.

The operation of this device as a camera is illustrated diagrammatically in Figs. 33, 34, 35, 36, 37 and 38. The first three of these views correspond to fragmentary top plan views of the hereinbefore described film plate 44, and show these positions of a group of consecutive relatively movable reflecting mediums, and the last three of these views show corresponding fragments of the sensitized film or positive film 34 with the exposures indicated thereon.

Referring to these Figs. 33 to 38, when the center of any selected one, A, of the hereinbefore described relatively movable reflecting mediums 124 is in vertical alinement with the center of the view aperture 56 as is indicated in Fig. 33 by the rectangle surrounding the letter A, all of the light which is reflected upwardly from this reflecting medium A passes through the aperture 56 and is focused upon a corresponding rectangular area or field A' (shown by line shading in Fig. 36) upon the under surface of the sensitized film or through the positive film 34 and any object, such for instance as a star in the center of the field of the objective lens system 11 and of which a "picture" is being taken, would appear as a real image A' arranged centrally on the corresponding exposed area A' of the film.

Prior to the time that the selected reflecting medium A has reached the position shown in Fig. 35, it has passed from a position shown in Fig. 34 through a position shown in Fig. 35 to that shown in Fig. 33 and the corresponding movements of the reflecting medium B are similarly indicated in Figs. 34 and 35 prior to the time that it has reached the position shown in Fig. 33 and as the reflecting medium A passes below that shown for it in Fig. 33, the reflecting medium comes into action and similarly traverses the view aperture 56. Each of the relatively movable reflecting mediums acts to effect the "exposure" of a corresponding rectangular area upon the film, and two consecutive relatively movable reflecting mediums A and B eventually acting to expose respectively two consecutive and contiguous rectangular equal areas on the film, as shown by the areas A' and B' shaded in dotted lines and in full lines respectively in Fig. 36. Disregarding infinitesimal interruptions, portions of two succeeding relatively movable reflecting mediums are always operating simultaneously to reflect corresponding and complementary portions of the picture upon the film.

This device may be used as a projector as well as a camera, it being only necessary to introduce a bright ray of light into the apparatus, as for instance, from the arc light through a suitable lens or system of lenses 316 and 317 to a reflecting medium 318 disposed above the film platform and in alinement with the aperture 56 therein so that when a positive film 34 is caused to simultaneously traverse between the film platform 44 and the presser plate 75 the light will pass through the positive film and will be caught and reflected by the reflecting system heretofore described and will finally emerge through the lens system 11 and may be focused upon the usual screen.

It is to be understood that when the device is used as a projector the lens system 316, 317 is closed as by a suitable cap 319 and the box or cover 159 for the presser plate would, of course, be removed. The arrangement of lenses for coöperating with the reflector when the device is used as a projector is indicated in Fig. 43 and the positions of the said elements with respect to the main casing and operative parts of the device are also indicated in Figs. 1 and 2.

Having thus described my invention, what I claim and desire to protect by Letters Patent of the United States is:

1. In an optical apparatus, the combination with a lens system for directing rays of light in a fixed direction, of a continuously movable photographic medium and compensating means to maintain successive portions of said medium consecutively in optically stationary relationship to said lens system while said medium is moving, said compensating means comprising a reflecting element continuously movable to change the direction of rays of light from a direction normal to said medium to a second direction, and a reflecting element continuously movable with respect to said first mentioned element to change the direction of rays of light from said second direction to a third direction and to change the direction of said rays of light from said third direction to said fixed direction.

2. In an optical apparatus, the combination with means for directing light in a given direction, of means arranged to reflect the light from said given direction through successive varying pathways, of a movable photographic medium arranged to intercept the reflected light, said second mentioned means comprising two reflectors one of said reflectors having a movement which is the resultant of a component movement of the said reflector in a direction parallel to the direction of movement of said photographic medium and at the same rate of speed as said medium, and a component movement transversely with respect to the movement of said photographic medium, and the other of said reflectors having a movement which is the resultant of two component movements, one of which movements changes the distance between said reflectors, and the other of which movements is in a direction parallel to and at the same rate as the resultant movement of said first mentioned reflector.

3. In an optical apparatus, the combination with a lens system for directing rays of light in a given direction of a continuously movable photographic medium and compensating means to maintain successive portions of said medium consecutively in optically stationary relationship to said lens system while said medium is moving, said compensating means comprising a reflector movable to change the direction of rays of light from a direction normal to said medium to a second direction, a reflector movable with respect to said first mentioned reflector to change the direction of rays of light from said second direction to a third direction and a third reflector stationary with respect to said second-mentioned reflector to change the direction of the rays of light from said third direction to said given direction.

4. In an optical apparatus, the combination with a lens system for directing rays of light in a given direction of a continuously movable photographic strip and compensating means to maintain successive portions of said strip consecutively in optically stationary relationship to said lens system while said strip is moving, said compensating means comprising a reflector movable in a predetermined straight line to change the direction of rays of light from a direction normal to said strip to a second direction, a reflector movable with respect to said first mentioned reflector to change the direction of rays of light from said second direction to a third direction and a third reflector stationary with respect to said second-mentioned reflector to change the direction of the rays of light from said third direction to said given direction.

5. In an optical apparatus the combination with a lens system for directing rays of light in a given path, of means for moving successive portions of an image strip successively through a fixed path, and compensating means to maintain said successive portions of said strip consecutively in optical stationary relationship to said lens system while said strip is continuously moving, said compensating means comprising a reflector movable to change the direction of the rays from a direction normal to said strip to a second direction, a reflector movable with respect to said first-mentioned reflector to change the direction of said rays of light from said second direction to a third direction, and a third reflector stationary with respect to said second-mentioned reflector to change the direction of the rays of light from said third direction to said given path.

6. In an optical apparatus, the combination with a lens system for directing rays of light in a given path, of means for continuously moving consecutive portions of an image strip successively in a fixed plane and in a fixed direction, and compensating means to maintain successive portions of said strip consecutively in optically stationary relationship to said lens system while said strip is being moved in said plane and in said direction, said compensating means including a reflecting element movable in a plane parallel to said first mentioned plane to change the direction of rays of light from a direction normal to said strip to a second direction, and a reflecting element movable with respect to said first mentioned element to change the direction of rays of light from said second direction to a third direction and to further change the direction of said rays of light from said third direction to said given path.

7. In an optical apparatus, the combination with a stationary lens system for directing rays of light in a given path, of means for moving consecutive portions of an image strip successively in a given plane and in a given direction, and compensating means to maintain two successive portions of said strip consecutively in optically stationary relationship to said lens system while said strip is being moved in said plane and in said direction, said compensating means including a reflector movable in a plane parallel to said first mentioned plane to change the direction of rays of light from a path normal to said strip to a second path, a reflector movable with respect to said first mentioned reflector to change the direction of rays of light from said second path to a third direction and a third reflector stationary with respect to said second above mentioned reflector to change the direction of the rays of light from said third path to said given path.

8. In an optical apparatus, the combination with a fixed continuously open lens system directing rays of light in a given path, of means for moving successive portions of an image strip consecutively through a given plane and in a given direction, and compensating means to maintain said successive portions consecutively in optically stationary relationship to said lens system as said portions are moved consecutively through said plane, said compensating means including a reflecting element arranged to be moved in a plane parallel to said first mentioned plane and in a direction extending transversely with respect to said strip.

9. In an optical apparatus, the combination with means for directing rays of light in a given path, of means for moving successive portions of an image strip consecutively through a given plane and in a given direction, and compensating means to maintain said successive portions consecutively in optically stationary relationship to said first mentioned means as said portions are moved consecutively through said plane, said compensating means including an element arranged to be moved in a plane parallel to said first mentioned plane and in a direction extending obliquely with respect to said strip.

10. In an optical apparatus, the combination with means for directing rays of light in a given path, of means for moving successive portions of an image strip consecutively through a given plane and in a given direction, and compensating means to maintain said successive portions consecutively in optically stationary relationship to said first mentioned means as said portions are moved consecutively through said plane, said compensating means including an element arranged to be moved in a plane parallel to said first mentioned plane and in a direction extending obliquely with respect to said strip, the movement of said element being the resultant of component movement of the said element in a direction parallel to the direction of movement of said image strip and at the same rate as said image strip, and a component movement extending transversely with respect to said image strip.

11. In an optical apparatus, the combination with means for directing rays of light in a given path, of means for moving consecutive portions of an image strip successively through a given plane and in a given direction, and compensating means to maintain said portions of said strip consecutively in optically stationary relationship to said first mentioned means while said portions are being moved through said plane, said compensating means comprising a reflector movable in a plane parallel to said first mentioned plane and in a direction extending obliquely with respect to said direction of movement of said strip, a second reflector movable in the same plane with said first mentioned reflector and in a direction and at a rate to vary the distance between said first and second reflectors and a third reflector stationary with respect to said second reflector and movable therewith.

12. In an optical apparatus, the combination with stationary means for directing rays of light in a given path, of means for moving consecutive portions of an image strip successively through a given plane and in a given direction, and compensating means to maintain said portions of said strip consecutively in optically stationary relationship to said first mentioned means while said portions are being moved through said plane, said compensating means comprising a reflector movable in a plane parallel to said first mentioned plane and in a direction extending obliquely with respect to said direction of movement of said strip, a second reflector movable in the same plane with said first mentioned reflector and in a direction and at a rate to vary the distance between said first and second reflectors and a third reflector stationary with respect to said second reflector and movable therewith.

13. In an optical apparatus, the combination with stationary means for directing rays of light in a given path, of means for moving consecutive portions of an image strip successively through a given plane and in a given direction, and compensating means to maintain said portions of said strip consecutively in optically stationary relationship to said first mentioned means while said portions are being moved through said plane, said compensating means comprising a reflector arranged to be covered through a predetermined straight path, a second reflector arranged to be moved in a second predetermined straight path, the arrangement of which is such as to vary the distance between said first and second reflectors during the movement thereof, and a third reflector movable with and maintained at a constant distance from the said second reflector.

14. In an optical apparatus, the combination with stationary means for directing rays of light in a given path, of means for moving consecutive portions of an image strip successively through a given plane and in a given direction, and compensating means to maintain said portions of said strip consecutively in optically stationary relationship to said first mentioned means while said portions are being moved through said plane, said compensating means comprising a reflector movable in a straight line parallel to said plane, a second reflector movable in a straight line and parallel to said plane and extending in a direction as to cause one of said reflectors to approach the other reflector during the movement thereof, and a third reflector movable with and maintained at a constant distance from said second reflector.

15. In an optical apparatus, the combination with stationary means for directing rays of light in a given path, of means for moving consecutive portions of an image strip successively through a given plane and in a given direction, and compensating means to maintain said portions of said strip consecutively in optically stationary relationship to said first mentioned means while said portions are being moved through said plane, said compensating means comprising a plane reflector maintained at a predetermined angle with respect to said plane and movable in a direction parallel thereto, a second plane reflector maintained at a given angle with respect to said plane and movable in a direction parallel thereto, and a third plane reflector maintained at a given angle and in a stationary relationship with respect to and movable with said second plane reflector.

16. In an optical apparatus, the combination with stationary means for directing rays of light in a given path, of means for moving consecutive portions of an image strip successively through a given plane and in a given direction, and compensating means to maintain said portions of said strip consecutively in optically stationary relationship to said first mentioned means while said portions are being moved through said plane, said compensating means comprising a plane reflector maintained at a predetermined angle with respect to said plane and movable in a direction parallel thereto, a second plane reflector maintained at a given angle with respect to said plane and movable in a direction parallel thereto, the direction of movement of one of said reflectors with respect to the other being such as to cause one of said reflectors to approach the other reflector when said reflectors are moved at predetermined rates, and a third reflector fixed with respect to and movable with said second reflector.

In witness whereof, I have hereunto set my hand this 19th day of January, 1916.

EDMOND H. LYSLE.